US012755750B2

(12) United States Patent
Cho et al.

(10) Patent No.: US 12,755,750 B2
(45) Date of Patent: Oct. 6, 2026

(54) AUDIO SIGNAL PROCESSING DEVICE AND OPERATING METHOD THEREFOR

(71) Applicant: SAMSUNG ELECTRONICS CO., LTD., Suwon-si (KR)

(72) Inventors: Kyuhyun Cho, Suwon-si (KR); Youngin Park, Suwon-si (KR); Myungjae Kim, Suwon-si (KR); Dongwan Kim, Suwon-si (KR); Heeseok Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 185 days.

(21) Appl. No.: 18/104,875

(22) Filed: Feb. 2, 2023

(65) Prior Publication Data

US 2023/0186938 A1 Jun. 15, 2023

Related U.S. Application Data

(63) Continuation of application No. PCT/KR2021/009733, filed on Jul. 21, 2021.

(30) Foreign Application Priority Data

Aug. 5, 2020 (KR) ........................ 10-2020-0098194

(51) Int. Cl.
*G10L 21/055* (2013.01)
*G10L 21/0208* (2013.01)
*G10L 25/78* (2013.01)

(52) U.S. Cl.
CPC ........ *G10L 21/055* (2013.01); *G10L 21/0208* (2013.01); *G10L 25/78* (2013.01); *G10L 2021/02082* (2013.01)

(58) Field of Classification Search
CPC ... G10L 21/055; G10L 21/0208; G10L 25/78; G10L 2021/02082; G10L 19/018; G10L 21/0356; G10L 19/008; G10L 25/03
See application file for complete search history.

(56) References Cited

U.S. PATENT DOCUMENTS 6,631,165 B1 * 10/2003 Lambert ................ H04L 27/00 375/259
7,555,116 B1 6/2009 Le Tourneur et al.
(Continued)

FOREIGN PATENT DOCUMENTS

EP 3 226 570 A1 10/2017
JP 2003517782 A * 5/2003
(Continued)

OTHER PUBLICATIONS

JP2011066668A-MT (Year: 2011).*
(Continued)

*Primary Examiner* — Darioush Agahi
(74) *Attorney, Agent, or Firm* — STAAS & HALSEY LLP

(57) ABSTRACT

An audio signal processing method including obtaining a first audio signal by generating a pattern in association with the first audio signal to be output, outputting the first audio signal, receiving, through an external voice input device while the external voice input device is communicatively connected to the audio signal processing device, a second audio signal including the output first audio signal, detecting the pattern from the second audio signal, and synchronizing the second audio signal with the first audio signal based on the pattern detected from the second audio signal and the pattern included in the first audio signal.

13 Claims, 15 Drawing Sheets

(56) References Cited

U.S. PATENT DOCUMENTS

| | | | | |
|---|---|---|---|---|
| 8,381,086 | B2 | 2/2013 | Li et al. | |
| 9,202,472 | B1 * | 12/2015 | Sharifi | G10L 19/018 |
| 9,311,924 | B1 * | 4/2016 | Blesser | G10L 19/018 |
| 9,595,997 | B1 * | 3/2017 | Yang | H04B 3/23 |
| 10,097,902 | B2 | 10/2018 | Rajapakse | |
| 11,546,693 | B2 | 1/2023 | Choi et al. | |
| 11,869,496 | B2 * | 1/2024 | Hara | G10L 13/00 |
| 2006/0100867 | A1 | 5/2006 | Lee et al. | |
| 2009/0304182 | A1 | 12/2009 | Choi et al. | |
| 2013/0138431 | A1 * | 5/2013 | Choi | G10L 19/008<br>704/201 |
| 2013/0171926 | A1 * | 7/2013 | Perret | G10L 19/018<br>455/3.06 |
| 2013/0261778 | A1 * | 10/2013 | Zitzmann | G10L 19/018<br>700/94 |
| 2014/0163979 | A1 * | 6/2014 | Suzuki | G10L 21/04<br>704/233 |
| 2014/0307884 | A1 | 10/2014 | Asada et al. | |
| 2014/0314250 | A1 * | 10/2014 | Park | G01S 5/30<br>381/92 |
| 2017/0019748 | A1 | 1/2017 | Cheon et al. | |
| 2017/0213567 | A1 * | 7/2017 | Stokking | G10L 21/0208 |
| 2017/0262255 | A1 * | 9/2017 | Shih | G06F 3/165 |
| 2019/0005953 | A1 * | 1/2019 | Bundalo | G06F 1/3287 |
| 2019/0179147 | A1 * | 6/2019 | Ichimura | G06F 3/167 |
| 2019/0372818 | A1 * | 12/2019 | Williams | H04J 13/0059 |
| 2021/0012789 | A1 * | 1/2021 | Husain | H04R 3/02 |

FOREIGN PATENT DOCUMENTS

| | | | | | |
|---|---|---|---|---|---|
| JP | 2011-055405 | A | | 3/2011 | |
| JP | 2011066668 | A | * | 3/2011 | H04M 9/082 |
| JP | 2015-069063 | A | | 4/2015 | |
| KR | 10-0644562 | B1 | | 11/2006 | |
| KR | 10-2012-0128329 | A | | 11/2012 | |
| KR | 10-1247000 | B1 | | 3/2013 | |
| KR | 10-1592518 | B1 | | 2/2016 | |
| KR | 10-2019-0043052 | A | | 4/2019 | |

OTHER PUBLICATIONS

JP2003517782A-MT (Year: 2003).*

International Search Report issued in International Application No. PCT/KR2021/009733 dated Oct. 22, 2021.

International Written Opinion issue in International Application No. PCT/KR2021/009733 dated Oct. 22, 2021.

Korean Office Action dated May 21, 2025 for Korean Application No. 10-2020-0098194.

Office Action dated Jan. 30, 2026, issued in Korean Application No. 10-2020-0098194.

* cited by examiner

FIG. 10
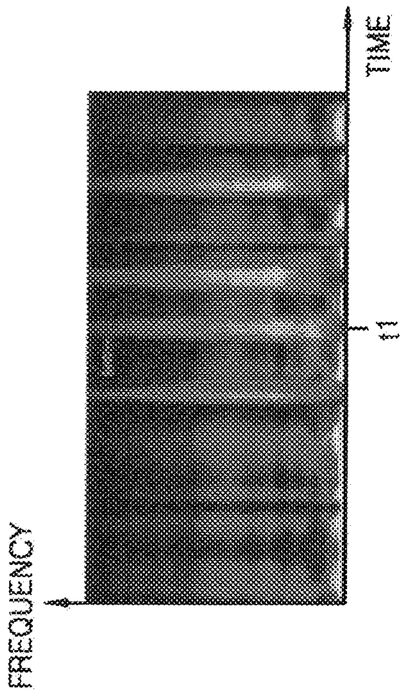
FIG. 10A
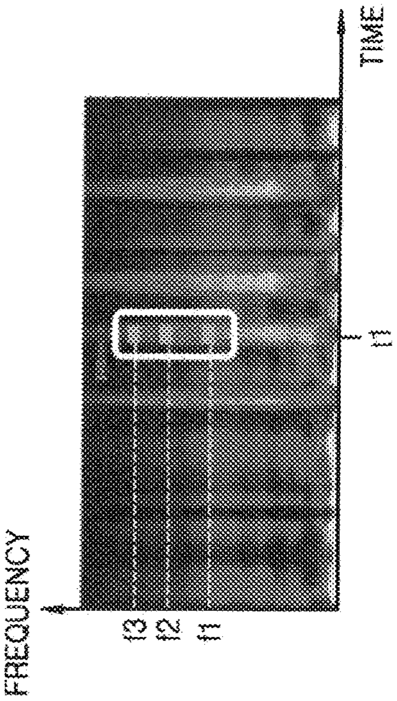
FIG. 10B
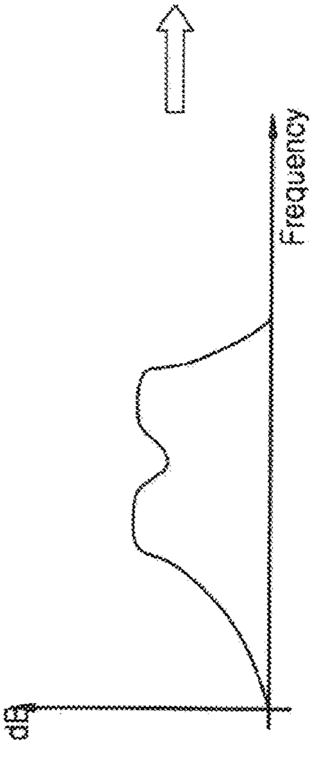
FIG. 10C
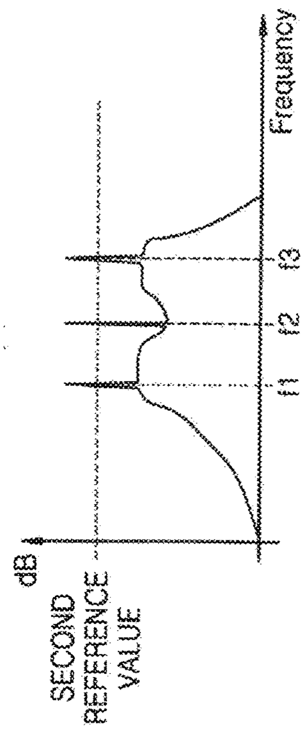
FIG. 10D FIG. 11
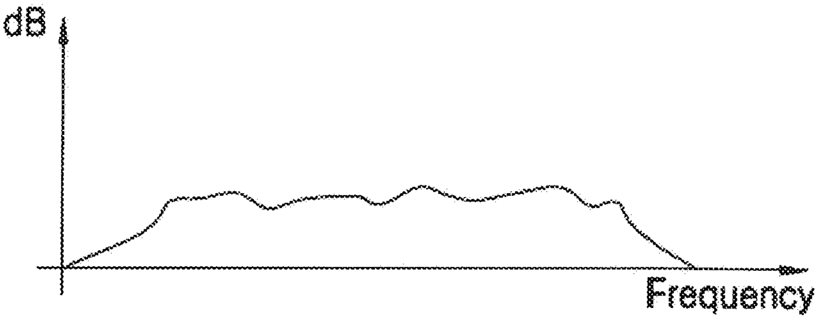
FIG. 11A
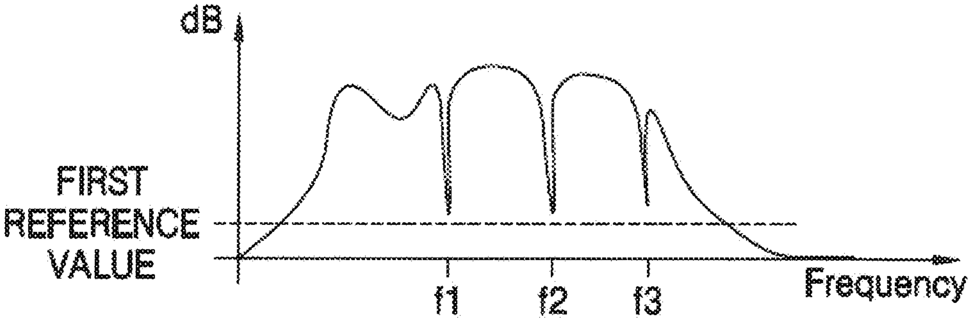
FIG. 11B
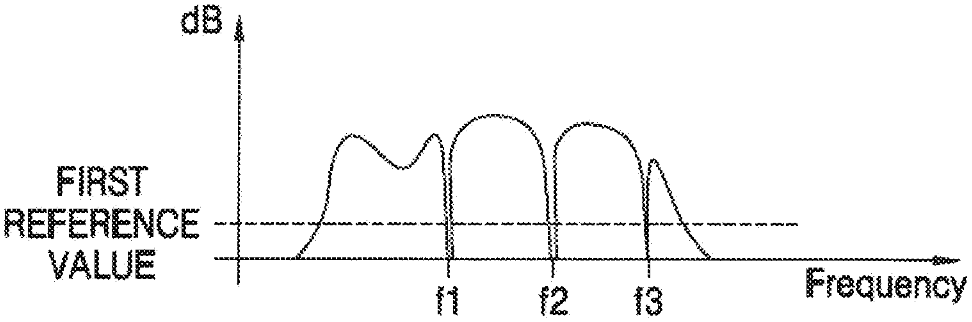
FIG. 11C

AUDIO SIGNAL PROCESSING DEVICE AND OPERATING METHOD THEREFOR

CROSS-REFERENCE TO RELATED APPLICATIONS

This application is a continuation application, under 35 U.S.C. § 111(a), of international application No. PCT/KR2021/009733, filed on Jul. 27, 2021, which claims priority under 35 U.S.C. § 119 to Korean Patent Application No. 10-2020-0098194, filed on Aug. 5, 2020, the disclosures of which are incorporated herein by reference in their entirety.

BACKGROUND

Field

Various embodiments of the present disclosure relate to an audio signal processing device and an operating method thereof, and more particularly, to an audio signal processing device capable of synchronizing an audio signal of the audio signal processing device with an audio signal of an external device connected to the audio signal processing device, and an operating method of the audio signal processing device.

Description of Related Art

The technology for making a voice call or a video call via the Internet between users at a distance from each other has become widely used. Also, speech recognition technology for controlling an electronic device by using a user's voice has been developed.

In order to perform such functions, the electronic device may include a speaker and a microphone. A voice or audio signal of a counterpart output by the electronic device through the speaker is input back to the electronic device through the microphone included in the electronic device, resulting in an echo. To prevent such an echo, echo cancellation is used.

An external microphone may be connected to an electronic device and used for various purposes. When an electronic device is connected with a different type of device, such as an external microphone, it is required to synchronize signals between the two devices. For synchronizing signals between heterogeneous devices, signals in an inaudible frequency band may be used. This approach synchronizes signals by outputting signals in an inaudible frequency band through a speaker, then receiving the signals through a microphone of the heterogeneous electronic device and processing the signals.

However, the specifications of some speakers do not support output of an inaudible signal, and some microphones are unable to recognize an inaudible signal and thus are unable to receive an input of an inaudible signal. In a case in which a signal of an electronic device and a signal input through an external microphone are not synchronized with each other, an echo is not accurately removed from the signal input through the microphone, resulting in a user's voice not being properly recognized.

SUMMARY

According to an embodiment, an audio signal processing method performed by an audio signal processing device may include obtaining a first audio signal by generating a pattern in association with an audio signal to be output, outputting the first audio signal, receiving, through an external voice input device while the external voice input device is communicatively connected to the audio signal processing device, a second audio signal including the output first audio signal, detecting the pattern from the second audio signal, and synchronizing the second audio signal with the first audio signal based on the pattern detected from the second audio signal and the pattern included in the first audio signal.

BRIEF DESCRIPTION OF DRAWINGS

This disclosure may be readily understood by reference to the following detailed description and the accompanying drawings, in which reference numerals refer to structural elements.

FIGS. 10A, 10B, 10C, and 10D are diagrams for describing a pattern being generated in an audio signal, according to an embodiment.

FIGS. 11A, 11B and 11C are diagrams for describing an audio signal processing device detecting a pattern after removing noise from an audio signal, according to an embodiment.

DETAILED DESCRIPTION OF EXEMPLARY EMBODIMENTS

Figure 1:
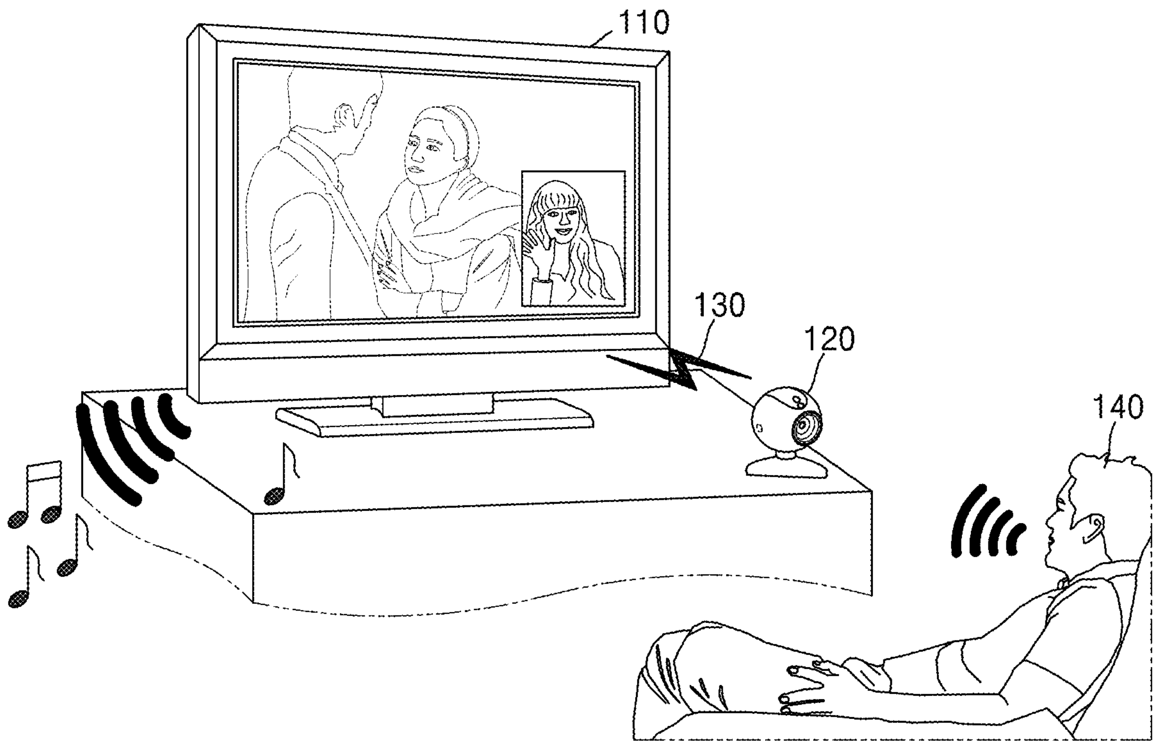
FIG. 1 is a diagram for describing synchronization of an external voice input device 120 with an audio signal processing device according to an embodiment.

According to an embodiment, an audio signal processing method performed by an audio signal processing device, which includes an internal microphone and is connected to an external voice input device, may include obtaining a first audio signal by generating a pattern in an audio signal to be output, outputting the first audio signal, receiving, through the external voice input device, a second audio signal including the output first audio signal, detecting the pattern from the second audio signal, receiving, through the internal microphone, a third audio signal including the output first audio signal, detecting the pattern from the third audio signal, and synchronizing the second audio signal with the third audio signal based on a difference between a time point at which the pattern is detected from the third audio signal and a time point at which the pattern is detected from the second audio signal.

In an embodiment, the method may further include removing an overlapping signal from the signals, which are synchronized with each other.

In an embodiment, the obtaining of the first audio signal may include generating the pattern in the audio signal to be output by modifying a magnitude of the audio signal to be output, at a certain frequency and a certain time point of the audio signal.

In an embodiment, the certain frequency may be a frequency at which the magnitude of the audio signal is greater than or equal to a certain value.

In an embodiment, the generating of the pattern may include modifying a magnitude of the audio signal at each of a plurality of frequencies.

In an embodiment, the obtaining of the first audio signal may include generating the pattern by decreasing the magnitude of the audio signal at the certain frequency to be less than or equal to a first reference value.

In an embodiment, the obtaining of the first audio signal may include generating the pattern by increasing the magnitude of the audio signal at the certain frequency to be greater than or equal to a second reference value.

In an embodiment, the detecting of the pattern may include detecting, as the pattern, a section including a certain number of points at which a magnitude of the audio signal is less than or equal to a first reference value.

In an embodiment, the detecting of the pattern may include detecting, as the pattern, a section including a certain number of points at which a magnitude of the audio signal is greater than or equal to a second reference value.

In an embodiment, the method may further include identifying whether a human voice is included in the second audio signal, and the detecting of the pattern from the second audio signal may be performed based on determining that the human voice is not included in the second audio signal.

In an embodiment, the identifying of whether the human voice is included in the second audio signal may be performed based on whether a signal of a certain frequency band with a certain magnitude or more is included in the second audio signal.

In an embodiment, the synchronizing of the first audio signal with the second audio signal may include synchronizing the first audio signal with the second audio signal by shifting a point at which the pattern is generated in the first audio signal, to a point at which the pattern is detected from the second audio signal.

In an embodiment, the method may further include receiving first noise through the external voice input device and storing the first noise, and removing the first noise from the second audio signal, and the synchronizing of the second audio signal with the first audio signal may be performed after the first noise is removed from the second audio signal.

In an embodiment, the synchronizing of the second audio signal with the third audio signal may include synchronizing the second audio signal with the third audio signal by delaying, among the second audio signal and the third audio signal, the audio signal having the earlier time point at which the pattern is detected, by the difference between the time points.

In an embodiment, the method may further include receiving first noise through the external voice input device and storing the first noise, removing the first noise from the second audio signal, receiving and storing second noise through the internal microphone, and removing the second noise from the third audio signal, and the synchronizing of the second audio signal with the third audio signal may be performed by using the second audio signal from which the first noise is removed and the third audio signal from which the second noise is removed.

According to an embodiment, an audio signal processing device connected to an external voice input device may include a speaker to output an audio signal, a memory storing one or more instructions, and a processor configured to execute the one or more instructions stored in the memory to obtain a first audio signal by generating a pattern in an audio signal to be output, control the speaker to output the first audio signal, receive, through the external audio input device, a second audio signal including the output first audio signal, detect the pattern from the second audio signal, and synchronize the second audio signal with the first audio signal based on the pattern detected from the second audio signal and the pattern included in the first audio signal.

According to an embodiment, an audio signal processing device connected to an external audio input device may include a speaker to output an audio signal, an internal microphone to receive an audio signal, a memory storing one or more instructions, and a processor configured to execute the one or more instructions stored in the memory, wherein the processor may obtain a first audio signal by generating a pattern in the audio signal to be output, the speaker outputs the first audio signal, the internal microphone receives a third audio signal including the output first audio signal, the processor receives, through the external audio input device, a second audio signal including the output first audio signal, detects the pattern from the second audio signal, detects the pattern from the third audio signal, and synchronize the second audio signal with the third audio signal based on the difference between a time point at which the pattern is detected from the third audio signal and a time point at which the pattern is detected from the second audio signal.

In an embodiment, the processor may generate the pattern in the audio signal to be output, by modifying an audio signal value of the audio signal to be output, at a certain frequency and a certain time point of the audio signal.

According to an embodiment, a computer-readable recording medium may have recorded thereon a program for executing an audio signal processing method including obtaining a first audio signal by generating a pattern in an audio signal to be output, outputting the first audio signal, receiving, through the external voice input device, a second audio signal including the output first audio signal, detecting the pattern from the second audio signal, and synchronizing the second audio signal with the first audio signal based on the pattern detected from the second audio signal and the pattern included in the first audio signal.

Hereinafter, embodiments of the present disclosure are described in detail with reference to the accompanying drawings for one of skill in the art to be able to perform the present disclosure without any difficulty. The present disclosure may, however, be embodied in many different forms and should not be construed as being limited to the embodiments of the present disclosure set forth herein.

Although the terms used herein are generic terms, which are currently widely used and are selected by taking into consideration functions thereof, the meanings of the terms may vary according to intentions of those skilled in the art, legal precedents, or the advent of new technology. Thus, the terms should be defined not by simple appellations thereof but based on the meanings thereof and the context of descriptions throughout the present disclosure.

In addition, terms used herein are for describing particular embodiments and are not intended to limit the scope of the present disclosure.

Throughout the present specification, when a part is referred to as being "connected to" another part, it may be "directly connected to" the other part or be "electrically connected to" the other part through an intervening element.

The term "the" and other demonstratives similar thereto in the descriptions of embodiments (especially in the following claims) should be understood to include a singular form and plural forms. In addition, when there is no description explicitly specifying an order of operations of a method according to the present disclosure, the operations may be performed in an appropriate order. The present disclosure is not limited to the order of the operations described.

As used herein, phrases such as "in some embodiments" or "in an embodiment" do not necessarily indicate the same embodiment.

Some embodiments of the present disclosure may be represented by block components and various process operations. All or some of such functional blocks may be implemented by any number of hardware and/or software components that perform particular functions. For example, functional blocks of the present disclosure may be implemented by using one or more microprocessors, or by using circuit elements for intended functions. For example, the functional blocks of the present disclosure may be implemented by using various programming or scripting languages. The functional blocks may be implemented as an algorithm to be executed by one or more processors. In addition, the present disclosure may employ related-art techniques for electronic configuration, signal processing, and/or data processing, etc. Terms such as "mechanism", "element", "unit", or "component" are used in a broad sense and are not limited to mechanical or physical components.

Also, connection lines or connection members between components illustrated in the drawings are merely illustrative of functional connections and/or physical or circuit connections. In an actual device, connections between components may be represented by various functional connections, physical connections, or circuit connections that are replaceable or added.

Also, as used herein, the terms such as " . . . er (or)", " . . . unit", " . . . module", etc., denote a unit that performs at least one function or operation, which may be implemented as hardware or software or a combination thereof.

In addition, as used herein, the term "user" denotes a person who controls a function or operation of an audio signal processing device or an external voice input device by using the audio signal processing device or the external voice input device, or uses the function thereof, and the term may include a consumer, a viewer, an administrator, or an installer.

Hereinafter, the present disclosure is described in detail with reference to the accompanying drawings.

FIG. 1 is a diagram for describing synchronization of an external voice input device with an audio signal processing device according to an embodiment.

With reference to FIG. 1, an example is described in which an audio signal processing device according to an embodiment is implemented as an image display device 110. However, this is only an example, and the present disclosure is not limited thereto, and it goes without saying that the audio signal processing device according to an embodiment may be independently implemented without being included in the image display device 110.

In FIG. 1, the image display device 110 including the audio signal processing device may be a television (TV), but is not limited thereto, and may be implemented as an electronic device including a display.

The image display device 110 may be connected to a source device (not shown). The source device may include at least one of a personal computer (PC), a compact disc CD player, a digital video disc (DVD) player, a video game console, a set-top box, an audio/video (AV) receiver, a cable receiver or a satellite broadcast receiver, and an Internet receiver that receives content from an over-the-top (OTT) service provider, an internet protocol TV (IPTV) service provider, or an external music streaming service provider.

The image display device 110 may receive content from the source device and output the content. The content may include TV programs provided by a music streaming server, a terrestrial or cable broadcasting station, an OTT service provider, an IPTV service provider, etc., items such as various movies or dramas provided through a video-on-demand (VOD) service, game sound sources received through a video game console, and sound sources of a CD or DVD received from a CD or DVD player. The content may include an audio signal, and may further include one or more of a video signal and a text signal. The image display device 110 may output, through a speaker in the image display device 110, the audio signal of the content received from the source device.

In an embodiment, the image display device 110 may output, through the speaker, a sound effect or the like generated by the image display device 110. The sound effect may include a sound generated and output by the image display device 110 in various environments, such as, a sound indicating the image display device 110 being powered on or off, a sound indicating a user interface being displayed on a screen, a sound indicating the source device being changed, or a sound indicating a user selecting content to watch or changing the channel by using a remote controller or the like.

In an embodiment, the image display device 110 may be a device that provides a voice assistant service that is controlled according to the user's utterance. The voice assistant service may be a service for performing an interaction between a user 140 and the image display device 110 by voice. The image display device 110 may output, through the speaker, various signals for providing the voice assistant service to the user 140.

In an embodiment, the image display device 110 may support a video or voice call function through the Internet with a counterpart terminal (not shown). The image display device 110 may output, to the user 140 through the speaker, an audio signal received from the counterpart terminal.

In an embodiment, the image display device 110 may include an internal microphone. The image display device 110 may receive a voice of the user 140 through the internal microphone and use the voice as a control signal for the image display device 110. Alternatively, the image display device 110 may transmit, to the counterpart terminal, the voice of the user 140 input through the internal microphone, such that an Internet call function is performed between the user 140 and the counterpart terminal.

The internal microphone included in the image display device 110 may collect ambient audio signals in addition to voices of the user 140. The ambient audio signals may include a signal output through the speaker of the image display device 110. When the signal output through the speaker of the image display device 110 is collected by the internal microphone and input back to the image display device 110, an echo occurs. The image display device 110 may use echo cancellation to prevent such echoes. Echo cancellation is for offsetting and thus canceling a signal, which has been output through a speaker and then input through a microphone, and may include acoustic echo canceller (AEC), noise suppressor (NS), active noise cancellation (ANC), automatic gain controller (AGC), etc.

In an embodiment, the image display device 110 may not have a microphone therein. In a case in which no microphone is provided in the image display device 110, or an internal microphone is provided in the image display device 110 but the performance of the internal microphone is poor, the user 140 may connect an external voice input device 120 including a microphone to the image display device 110 and use the external voice input device 120. Alternatively, regardless of the presence or absence of an internal microphone or the performance of the internal microphone, the user 140 may connect a device including a camera, such as a webcam, to the image display device 110 in order to perform a video call with the counterpart by using the image display device 110. Because the webcam includes a microphone in addition to a camera, when the webcam is connected to the image display device 110, the microphone included in the webcam is connected to the image display device 110 as the external voice input device 120.

Like the internal microphone of the image display device 110, the external voice input device 120 may also collect a signal output through the speaker of the image display device 110. When an audio signal output through the speaker of the image display device 110 is collected by the external voice input device 120 and input back to the image display device 110, an echo occurs.

Unlike an audio signal input through the internal microphone of the image display device 110, it is difficult to remove an echo from the audio signal input through the external voice input device 120. This is because the external voice input device 120 and the image display device 110 may be asynchronous with each other. Because the image display device 110 and the external voice input device 120 are separate from each other, they do not use the same hardware. Accordingly, time points at which the audio signals collected by the two devices are input may be different from each other depending on the specifications of the devices.

In addition, there may be a time delay in data input depending on a communication scheme according to a connection interface between the image display device 110 and the external voice input device 120. The image display device 110 and the external voice input device 120 may be connected to each other through a communication network 130, which may be any one of various networks, such as a universal serial bus (USB), high-definition multimedia interface (HDMI), Bluetooth, or Wi-Fi. In this case, the data transmission rate of the communication network 130 through which the image display device 110 and the external voice input device 120 are connected to each other may vary depending on the communication scheme. For example, a wired communication scheme may have a higher data transmission rate than that of a wireless communication scheme. In addition, the scheme or rate of data transmission varies depending on the device or specification even when the same wired or wireless communication scheme is used, and thus, a time period required for the external voice input device 120 to transmit an audio signal to the image display device 110 may be different from a time period required for for the internal microphone included in the image display device 110 to receive the audio signal.

Accordingly, in a case in which synchronization between the external voice input device 120 and the image display device 110 has not been performed, an echo may not be accurately removed from the signal input to the image display device 110, resulting in the voice of the user 140 not being accurately recognized.

In an embodiment, the image display device 110 may use a pattern to perform synchronization with the external voice input device 120. The image display device 110 may generate a pattern in an audio signal to be output through the speaker. The audio signal to be output may include at least one of an audio signal included in content, a sound effect, a signal for providing the voice assistant service, or a voice of the counterpart received from the counterpart terminal.

For example, when the user 140 is watching a movie, the image display device 110 may output, through the speaker, an audio signal included in the movie content. It is assumed that the user 140 wants to make a video call with the counterpart terminal while watching a movie. In an embodiment, when the user 140 requests the image display device 110 to start a video call service, the image display device 110 may obtain a first audio signal by generating a pattern in an audio signal to be output, that is, an audio signal of the movie content. The image display device 110 may output the first audio signal through the speaker. The first audio signal output through the speaker may be input back through the external voice input device 120.

The external voice input device 120 may collect a second audio signal including the output first audio signal. The second audio signal may include ambient noise or a voice of the user 140, in addition to the first audio signal, which includes the audio signal of the movie in which the pattern is generated.

The image display device 110 may detect the pattern from the second audio signal. Because the second audio signal includes the first audio signal, the pattern may also be included in the second audio signal. The image display device 110 may synchronize the second audio signal with the first audio signal by using the pattern detected from the second audio signal and the pattern included in the first audio signal. The image display device 110 may remove an overlapping signal by using the synchronized first and second audio signals. That is, the image display device 110 may remove the audio signal of the movie content from the second audio signal.

In an embodiment, in a case in which the image display device 110 includes an internal microphone, the internal microphone of the image display device 110 may receive a third audio signal including the output first audio signal. The third audio signal may further include ambient noise or a voice of the user 140, in addition to the first audio signal, which includes the audio signal of the movie in which the pattern is generated.

The image display device 110 may detect the pattern from the third audio signal. The image display device 110 may synchronize the second audio signal with the third audio signal based on the difference between a time point at which the pattern is detected from the third audio signal and a time point at which the pattern is detected from the second audio signal. The image display device 110 may remove an overlapping signal from the two signals synchronized with each other. That is, the image display device 110 may remove the audio signal of the movie content, which is common to both the second audio signal and the third audio signal. The image display device 110 may remove the overlapping signal and transmit the remaining signal to an external user terminal such that an Internet call is performed or the remaining signal is used as a control signal for the image display device 110 in the voice assistant service.

As such, according to the embodiment, in a case in which the external voice input device 120 is connected to the image display device 110, the image display device 110 may generate a certain pattern in an audio signal before outputting the audio signal, detect the pattern from a signal input back through the external voice input device 120, and use the pattern to synchronize the image display device 110 with the external voice input device 120.

In addition, according to an embodiment, in a case in which the image display device 110 includes an internal microphone, the image display device 110 may detect a pattern from each of a signal input through the external voice input device 120 and a signal input through the internal microphone, and use the patterns to synchronize the image display device 110 with the external voice input device 120.

Figure 2:
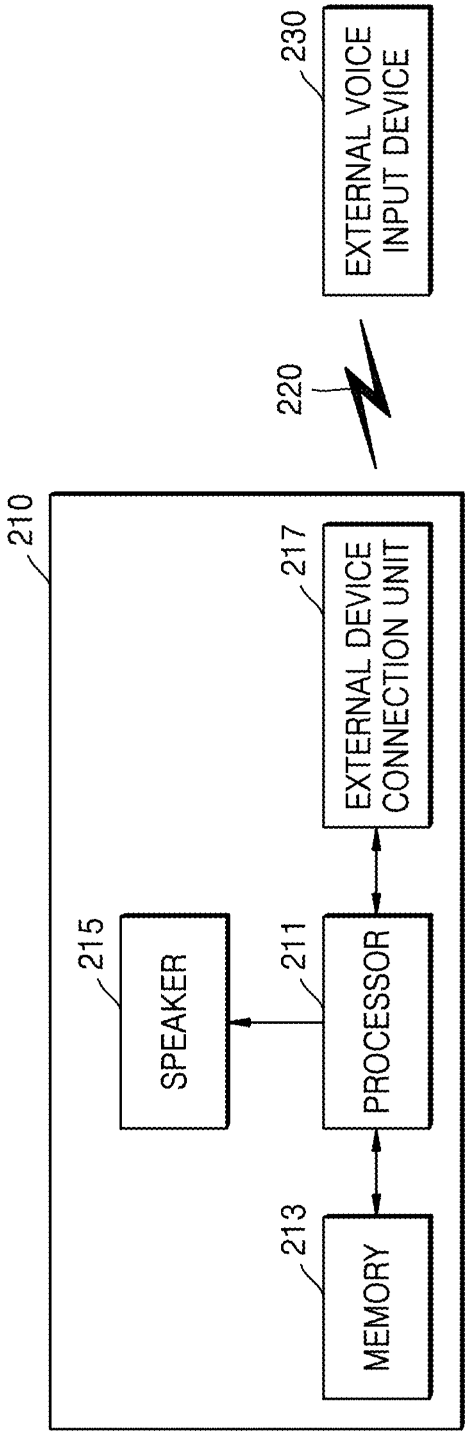
FIG. 2 is an internal block diagram of an audio signal processing device 210 that performs synchronization with an external voice input device 230, according to an embodiment.

FIG. 2 is an internal block diagram of an audio signal processing device 210 that performs synchronization with an external voice input device 230, according to an embodiment.

Referring to FIG. 2, the audio signal processing device 210 may receive a signal from the external voice input device 230 through a communication network 220.

In an embodiment, the audio signal processing device 210 may be an electronic device capable of outputting an audio signal and receiving an audio signal from the external voice input device 230 through the communication network 220.

In detail, the audio signal processing device 210 may include at least one of a desktop computer, a smart phone, a tablet PC, a mobile phone, a video phone, an e-book reader, a laptop PC, a netbook computer, a digital camera, a personal digital assistant (PDA), a portable multimedia player (PMP), a camcorder, a navigation device, a wearable device, a smart watch, a security system, a medical device, and a home appliance controllable by a home Internet-of-Things (IoT) platform, for example, an in-home TV, washing machine, refrigerator, microwave, or computer.

In detail, the audio signal processing device 210 according to an embodiment may be included in or mounted in a desktop computer, a smart phone, a tablet PC, a mobile phone, a video phone, an e-book reader, a laptop PC, a netbook computer, a digital camera, a PDA, a PMP, a camcorder, a navigation device, a wearable device, a smart watch, a security system, a medical device, and a home appliance controllable by a home IoT platform, for example, an in-home TV, washing machine, refrigerator, microwave, and computer.

The audio signal processing device 210 may be stationary or mobile.

The audio signal processing device 210 may be connected to the external voice input device 230 through the communication network 220. The communication network 220 may be a wired or wireless communication network. The communication network 220 may be a wired communication network, such as a cable, or may be a network conforming to a wireless communication standard, such as Bluetooth, wireless local area network (WLAN) (e.g., Wi-Fi), Wibro, Worldwide Interoperability for Microwave Access (WiMAX), code-division multiple access (CDMA), or wideband CDMA (WCDMA).

The external voice input device 230 may be an electronic device separate from the audio signal processing device 210, and may include an audio signal collecting device, such as a wireless microphone or a wired microphone. The external voice input device 230 may transmit collected audio signals to the audio signal processing device 210.

In an embodiment, the audio signal processing device 210 may include a processor 211, a memory 213, a speaker 215, and an external device connection unit 217.

The memory 213 according to an embodiment may store at least one instruction. The memory 213 may store at least one program to be executed by the processor 211. The memory 213 may store data input to or output from the audio signal processing device 210.

In an embodiment, when the processor 211 generates a pattern in an audio signal, the memory 213 may store the audio signal in which the pattern is generated. Alternatively, the memory 213 may store information, such as a frequency at which the pattern is generated, the number of frequencies at which the pattern is generated, a value by which the magnitude of the audio signal in the frequency has increased or decreased.

The memory 213 may include at least one of a flash memory-type storage medium, a hard disk-type storage medium, a multimedia card micro-type storage medium, a card-type memory (e.g., SD or XD memory), random-access memory (RAM), static RAM (SRAM), read-only memory (ROM), electrically erasable programmable ROM (EEPROM), programmable ROM (PROM), magnetic memory, a magnetic disk, or an optical disc.

The speaker 215 may convert an electrical signal into sound energy that is audibly recognizable by the user, and then output the sound energy. The speaker 215 may output at least one of an audio signal included in content received from the source device, various sound effects generated by the audio signal processing device 210, various interaction audio signals output by the audio signal processing device 210 to provide a voice assistant service, or a counterpart's voice from a counterpart terminal (not shown) received by the audio signal processing device 210 through the Internet.

In an embodiment, the external device connection unit 217 may be a receiving module that receives an audio signal from the external voice input device 230 through the communication network 220. The external device connection unit 217 may include at least one of an HDMI port, a component jack, a PC port, or a USB port. Alternatively, the external device connection unit 217 may include at least one of communication modules, such as WLAN, Bluetooth, near-field communication (NFC), or Bluetooth Low Energy (BLE).

The processor 211 controls the overall operation of the audio signal processing device 210. The processor 211 may control the audio signal processing device 210 to function by executing one or more instructions stored in the memory 213.

In an embodiment, the processor 211 may generate a pattern in an audio signal to be output, before the speaker 215 outputs the audio signal. The processor 211 may generate the pattern by modifying the magnitude of the audio signal to be output, at a certain frequency and a certain time point thereof. The processor 211 may modify the magnitude of the audio signal at each of one or more frequencies.

In an embodiment, the processor 211 may generate a pattern in an audio signal whenever the audio signal needs to be received through the external voice input device 230. For example, the processor 211 may generate a pattern in an audio signal from the start of providing a voice assistant service. Alternatively, when the audio signal processing device 210 is powered on, the processor 211 may generate a pattern in an audio signal to be output thereafter. Alternatively, when an Internet call is started, for example, when a user requests a call connection with a counterpart terminal by using the audio signal processing device 210, the processor 211 may generate a pattern in an audio signal to be output thereafter.

In an embodiment, the processor 211 may generate a pattern in an audio signal to be continuously output at every certain period. Alternatively, the processor 211 may generate a pattern in an audio signal whenever the external voice input device 230 and the audio signal processing device 210 are asynchronous with each other, for example, whenever an error occurs in the communication connection between the audio signal processing device 210 and the external voice input device 230. Through this, the processor 211 may maintain synchronization between the external voice input device 230 and the audio signal processing device 210 when an audio signal is received through the external voice input device 230.

The processor 211 may obtain a patterned audio signal by generating a pattern in an audio signal to be output. Hereinafter, an audio signal obtained by generating a pattern in an audio signal to be output by the processor 211 is referred to as a first audio signal.

The speaker 215 may output a first audio signal. The first audio signal output through the speaker 215 may be collected by the external voice input device 230. The external voice input device 230 may collect, in addition to the first audio signal, other ambient audio signals, such as white noise or the user's utterance. Hereinafter, a signal collected by the external voice input device 230 and then transmitted to the audio signal processing device 210 is referred to as a second audio signal. The external voice input device 230 may transmit, to the audio signal processing device 210 through the communication network 220, a second audio signal including the first audio signal.

The audio signal processing device 210 may receive the second audio signal from the external voice input device 230 through the external device connection unit 217.

The processor 211 may detect a pattern from the second audio signal received from the external voice input device 230. The processor 211 may determine whether a pattern is included in the second audio signal by using information about the pattern retrieved from the memory 213.

In an embodiment, whenever a pattern is generated in an audio signal to be output, the processor 211 may detect the pattern from the second audio signal received from the external voice input device 230, for a certain time period after the generation of the pattern.

In an embodiment, the processor 211 may continuously detect the pattern from the second audio signal until the pattern is detected. In a case in which the second audio signal further includes a human voice or the like in addition to the first audio signal, it may be difficult to accurately detect the pattern from the second audio signal because the human voice is added to the pattern. In this case, the processor 211 may continue to detect the pattern from the second audio signal until the pattern is detected from the second audio signal, that is, until no human voice is included.

In another embodiment, the processor 211 may first determine whether a human voice is included in the second audio signal, and then, only when no human voice is included in the second audio signal, detect the pattern from the second audio signal. The processor 211 may determine whether a human voice is included in the second audio signal by determining whether at least certain amount of a signal in a frequency domain of a human voice is included in the second audio signal. In general, a male voice has a frequency range of 100 Hz to 150 Hz, and a female voice has a frequency range of 200 Hz to 250 Hz. Accordingly, in a case in which the input second audio signal does not include a signal in the frequency range of 100 Hz to 250 Hz of a predetermined loundness or more, the processor 211 may determine that no human voice is included in the second audio signal and then perform pattern detection.

The processor 211 may synchronize the second audio signal with the first audio signal by using a time point at which the first audio signal is generated, that is, a time point at which a pattern is generated in an audio signal to be output, and a time point at which the pattern is detected from the second audio signal. Synchronizing the second audio signal with the first audio signal may mean shifting a point at which the pattern is generated in the first audio signal to a point at which the pattern is detected from the second audio signal. The processor 211 may simultaneously process the second audio signal and the shifted first audio signal, thereby removing an overlapping signal from the two signals.

Figure 3:
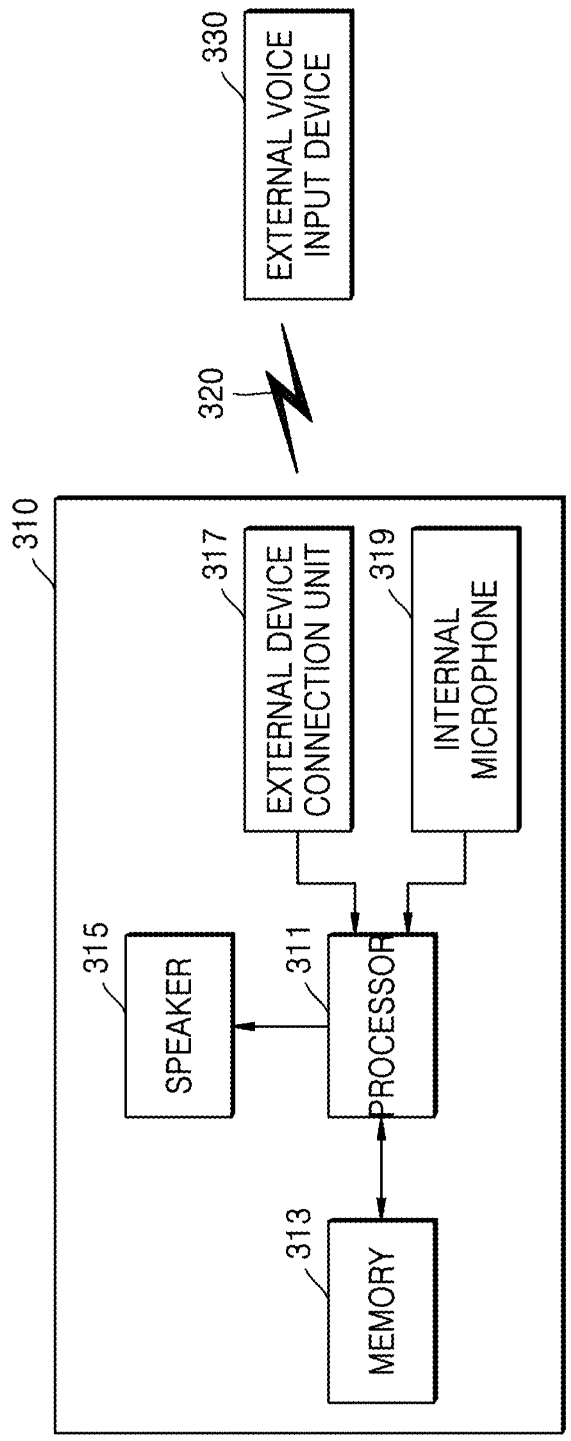
FIG. 3 is an internal block diagram of an audio signal processing device 310 that performs synchronization with an external voice input device 330, according to another embodiment.

FIG. 3 is an internal block diagram of an audio signal processing device 310 that performs synchronization with an external voice input device 330, according to another embodiment.

The audio signal processing device 310 of FIG. 3 may include a processor 311, a memory 313, a speaker 315, an external device connection unit 317, and an internal microphone 319. The functions of the memory 313, the speaker 315, and the external device connection unit 317 included in the audio signal processing device 310 of FIG. 3 are the same as those of the memory 213, the speaker 215, and the external device connection unit 217 included in the audio signal processing device 210 of FIG. 2, and thus, hereinafter, redundant descriptions thereof are omitted.

Unlike the audio signal processing device 210 of FIG. 2, the audio signal processing device 310 of FIG. 3 may include the internal microphone 319. The internal microphone 319 is a microphone provided in the audio signal processing device 310, and may collect ambient audio signals, like the external voice input device 230.

The processor 311 may obtain a first audio signal by generating a pattern in an audio signal to be output through the speaker 315. The speaker 315 may output the first audio signal including the pattern. The first audio signal output through the speaker 315 may be collected by the external voice input device 230. The external voice input device 230 may obtain a second audio signal by collecting the first audio signal and other ambient noise, and transmit the second audio to the audio signal processing device 310 through a communication network 320. The audio signal processing device 310 receives the second audio signal from the external voice input device 330 through the external device connection unit 317. The processor 311 may detect the pattern from the second audio signal.

In an embodiment, like the external voice input device 330, the internal microphone 319 may collect the first audio signal output through the speaker 315 and other ambient noise. Hereinafter, an audio signal collected by the internal microphone 319 is referred to as a third audio signal.

In general, the internal microphone 319 and the external voice input device 330 differ in specification from each other, and thus, differ in sound collection performance from each other. In general, the internal microphone 319 has poorer sound collection performance than that of the external voice input device 330. In addition, the internal microphone 319 is included in the audio signal processing device 310 and thus is closer to the speaker 215, and accordingly, in the third audio signal collected by the internal microphone 319, the audio signal output through the speaker 215 occupies a larger part than other ambient audio signals.

In addition, a time point at which an audio signal is input through the internal microphone 319 may be different from a time point at which the audio signal is input through the external voice input device 330. This is because, unlike an audio signal is input as soon as the internal microphone 319 collects the audio signal, the external voice input device 330 does not transmit collected data in real time, but may accumulate data in a certain amount, such as in a block unit, and then transmit the accumulated data at once. In addition, a signal collected by the external voice input device 330 is input through the communication network 320 and the external device connection unit 217, and thus, a time point at which data is input may vary depending on the types of or the communication scheme between the communication network 320 and the external device connection unit 217. Accordingly, in an embodiment, the processor 311 synchronizes the third audio signal received through the internal microphone 319 with the second audio signal received through the external voice input device 330.

The processor 311 may detect the pattern from the third audio signal received through the internal microphone 319. The third audio signal includes the first audio signal output through the speaker 315, and thus, may also include the pattern included in the first audio signal.

The processor 311 may synchronize the second audio signal with the third audio signal, based on the difference between a time point at which the pattern is detected from the second audio signal received through the external voice input device 330, and a time point at which the pattern is detected from the third audio signal received through the internal microphone 319. That is, the processor 311 may synchronize the second audio signal with the third audio signal by shifting the earlier one of points at which the pattern is detected from the second audio signal and the third audio signal, respectively, to the later point.

The processor 311 simultaneously processes the second audio signal and the third audio signal, which are synchronized with each other, thereby removing an overlapping signal from the two signals.

In an embodiment, in a case in which the audio signal processing device 310 includes the internal microphone 319, the processor 311 or the user may determine whether to use the internal microphone 319.

For example, the processor 311 or the user may select one method by which an echo signal is better removed, from among a method of synchronizing the devices with each other by using the internal microphone 319, and a method of synchronizing the devices with each other by using the first audio signal and the second audio signal without using the internal microphone 319.

In a case in which the processor 311 or the user is to synchronize the audio signal processing device 310 with the external voice input device 330 by using the internal microphone 319, the audio signal processing device 310 may synchronize the two devices with each other by using the pattern included in the second audio signal and the third audio signal as described above.

In another embodiment, in a case in which the processor 311 or the user is to synchronize the audio signal processing device 310 with the external voice input device 330 without using the internal microphone 319, the audio signal processing device 310 may synchronize the two devices with each other by using the method described above with reference to FIG. 2, that is, by using the first audio signal and the second audio signal.

Figure 4:
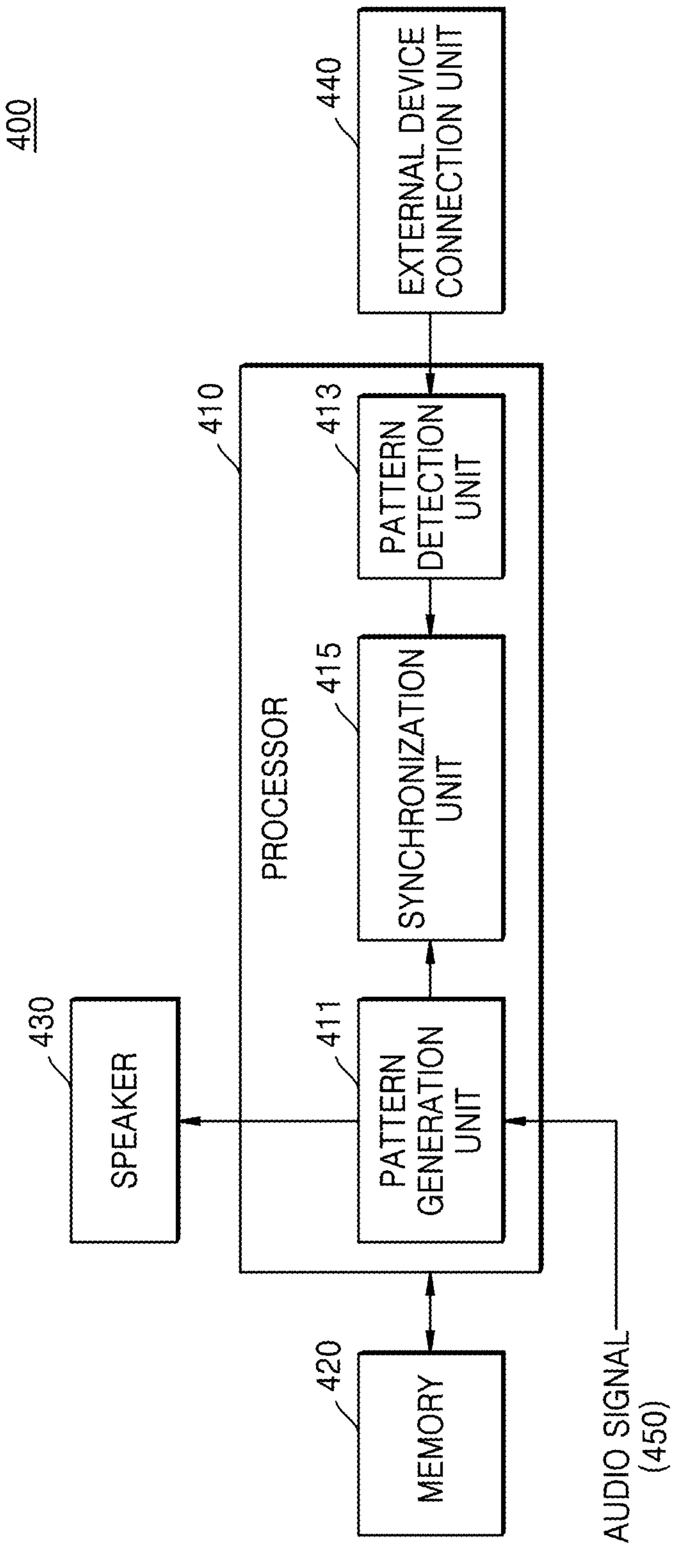
FIG. 4 is an internal block diagram of an audio signal processing device 400 according to an embodiment.

FIG. 4 is an internal block diagram of an audio signal processing device 400 according to an embodiment. The audio signal processing device 400 of FIG. 4 may be included in the audio signal processing device 210 of FIG. 2. The audio signal processing device 400 of FIG. 4 may include a processor 410, a memory 420, a speaker 430, and an external device connection unit 440, and the processor 410 may include a pattern generation unit 411, a pattern detection unit 413, and a synchronization unit 415.

The audio signal processing device 400 may receive an audio signal 450 from an external broadcasting station, an external server, an external game console, or the like, or may read the audio signal 450 from a DVD player or the like. The pattern generation unit 411 may generate a pattern in the audio signal 450 before the speaker 430 outputs the audio signal 450. For example, the pattern generation unit 411 may generate the pattern in the audio signal 450 before outputting, to the speaker 430, the audio signal 450 included in content, which is a broadcast program. The pattern generation unit 411 may generate the pattern by modifying the magnitude of the audio signal 450 to be output, at a certain frequency and a certain time point thereof.

In an embodiment, the pattern generation unit 411 may modify the magnitude of the audio signal 450 at an arbitrary frequency. Alternatively, in an embodiment, the pattern generation unit 411 may search for a frequency at which the magnitude of the audio signal 450 is greater than a certain value, and modify the magnitude of the audio signal 450 at the frequency.

A certain frequency may refer to one frequency value or a frequency range, such as a certain frequency band including a plurality of frequencies.

The pattern generation unit 411 may generate the pattern by modifying the magnitude of the audio signal 450 at one or more frequencies. In an embodiment, the pattern generation unit 411 may search for a certain number of frequencies at which the magnitude of the audio signal 450 is greater than or equal to a certain value, and remove an audio signal at the frequencies. Alternatively, in an embodiment, the pattern generation unit 411 may add a sound to the audio signal at a certain frequency such that the magnitude of the audio signal at the frequency increases.

In an embodiment, the pattern generation unit 411 may generate the pattern in the audio signal 450 from a time point at which the external voice input device 230 is used, such as when a voice assistant service is started or an Internet call function is started.

The pattern generation unit 411 may generate the pattern in the audio signal 450 every certain period or at a particular time point, for example, whenever an error occurs in the communication connection with the external voice input device 230.

The pattern generation unit 411 may generate the pattern in the audio signal 450 to obtain a patterned audio signal, that is, the first audio signal.

The memory 420 may store the first audio signal generated by the pattern generation unit 411. The memory 420 may store information about the pattern. The information about the pattern may include at least one of a frequency at which the pattern is generated, the magnitude of the audio signal at the frequency, or the number of frequencies at which the pattern is generated.

The speaker 430 may output the first audio signal. The first audio signal output through the speaker 430 may be collected by the external voice input device 230 and then included in the second audio signal. The second audio signal generated by the external voice input device 230 may be input through the external device connection unit 440.

The pattern detection unit 413 may detect the pattern from the second audio signal received from the external voice input device 230. The pattern detection unit 413 may determine whether the pattern is included in the second audio signal by using the information about the pattern received from the memory 313.

For example, in a case in which the pattern generation unit 411 has generated the pattern in the audio signal 450 by removing audio signals at three particular frequencies, the pattern detection unit 413 may detect, as the pattern, a section of the second audio signal, which includes three points at which the magnitude of the audio signal is less than or equal to a first reference value.

For example, in a case in which the pattern generation unit 411 has generated the pattern in the audio signal 450 by adding audio signals at four particular frequencies, the pattern detection unit 413 may detect, as the pattern, a section of the second audio signal, which includes four points at which the magnitude of the audio signal is greater than or equal to a second reference value.

In an embodiment, whenever the pattern generation unit 411 generates the pattern in the audio signal 450, the pattern detection unit 413 may detect the pattern from the second audio signal received from the external voice input device 230, for a certain time period after a time point at which the pattern is generated.

In an embodiment, the pattern detection unit 413 may continuously perform pattern detection until the pattern is detected from the second audio signal. Alternatively, the pattern detection unit 413 may first determine whether a human voice is included in the second audio signal, and then, only when no human voice is included in the second audio signal, detect the pattern from the second audio signal.

The synchronization unit 415 may retrieve, from the pattern generation unit 411, information about a point or time point at which the pattern is generated in the audio signal 450. Alternatively, in an embodiment, the memory 420 may store a time point at which the pattern is generated in the audio signal 450, a frequency at which the pattern is generated, the number of frequencies at which the pattern is generated, the magnitude of the audio signal after the pattern is generated, etc. In this case, the synchronization unit 415 may retrieve, from the memory 420, the information about the pattern.

The synchronization unit 415 may retrieve, from the pattern detection unit 413, information about a time point or point at which the pattern is detected from the second audio signal. By using a point at which the pattern is detected from the second audio signal and a point at which the pattern is generated in the first audio signal, the synchronization unit 415 may shift the point at which the pattern is generated in the first audio signal, to the point at which the pattern is detected from the second audio signal. This may mean that the synchronization unit 415 delays the time point at which the pattern is generated in the first audio signal until the time point at which the pattern is detected from the second audio signal. The synchronization unit 415 may cause the second audio signal and the first audio signal to be simultaneously processed at the time point at which the pattern is detected from the second audio signal, thereby synchronizing the two signals with each other.

Figure 5:
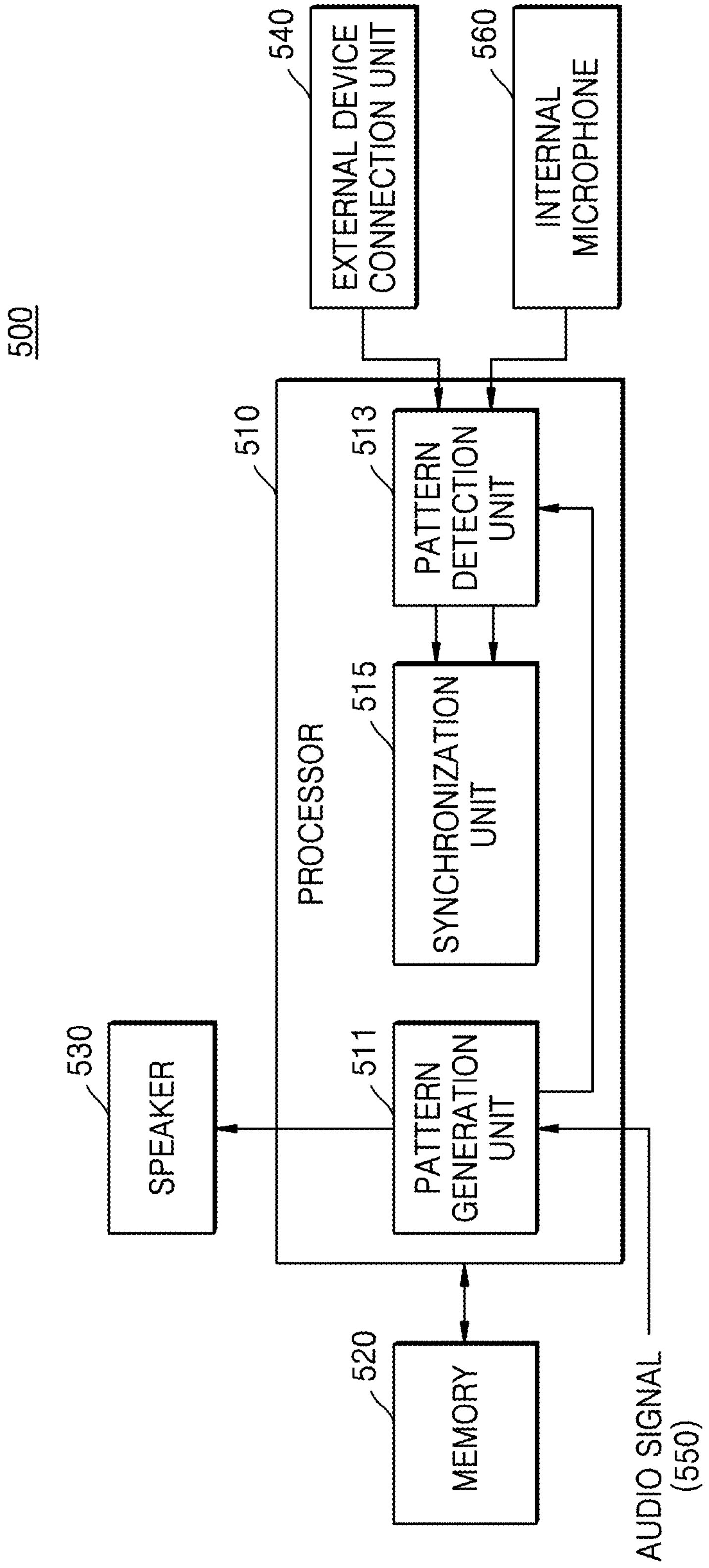
FIG. 5 is an internal block diagram of an audio signal processing device 500 according to another embodiment.

FIG. 5 is an internal block diagram of an audio signal processing device 500 according to another embodiment. The audio signal processing device 500 of FIG. 5 may be included in the audio signal processing device 310 of FIG. 3. The audio signal processing device 500 of FIG. 5 may include a processor 510, a memory 520, a speaker 530, an external device connection unit 540, and an internal microphone 560, and the processor 510 may include a pattern generation unit 511, a pattern detection unit 513, and a synchronization unit 515.

The functions of the memory 520, the speaker 530, and the external device connection unit 540 included in the audio signal processing device 500 of FIG. 5 are the same as those of the memory 420, the speaker 430, and the external device connection unit 440 included in the audio signal processing device 400 of FIG. 4, and thus, hereinafter, redundant descriptions thereof are omitted.

The pattern generation unit 511 may obtain a first audio signal by generating a pattern in an audio signal 550. The speaker 530 may output the first audio signal generated by the pattern generation unit 511.

The external device connection unit 540 may receive, from the external voice input device 330, a second audio signal including the first audio signal.

The pattern detection unit 513 may detect the pattern from the second audio signal input through the external device connection unit 540.

In an embodiment, the internal microphone 560 may obtain a third audio signal including the first audio signal, which is output through the speaker 530. The third audio signal may further include ambient noise or a user's voice, in addition to the first audio signal.

In an embodiment, the pattern detection unit 513 may detect the pattern from the third audio signal received by the internal microphone 560.

The synchronization unit 515 may synchronize the second audio signal with the third audio signal, based on the difference between a time point at which the pattern is detected from the second audio signal received through the external voice input device 330, and a time point at which the pattern is detected from the third audio signal received through the internal microphone 560. That is, the synchronization unit 515 may shift the earlier one of time points at which the pattern is detected from the second audio signal and the third audio signal, respectively, to the later time point. The synchronization unit 515 may synchronize the second audio signal with the third audio signal by shifting the earlier one of the time points at which the pattern is detected from the audio signals, respectively, to the later time point.

Figure 6:
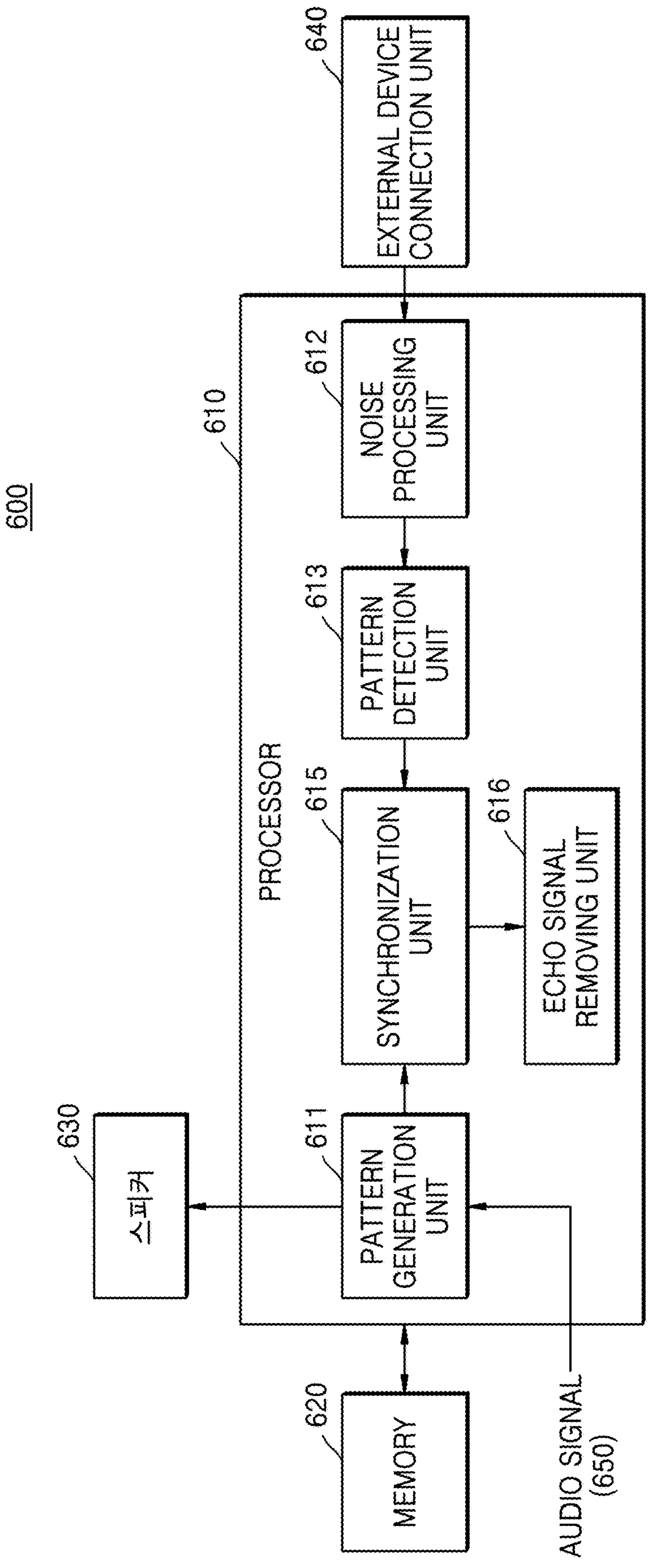
FIG. 6 is an internal block diagram of an audio signal processing device 600 according to an embodiment.

FIG. 6 is an internal block diagram of an audio signal processing device 600 according to an embodiment. The audio signal processing device 600 of FIG. 6 may be included in the audio signal processing device 400 of FIG. 4.

The audio signal processing device 600 of FIG. 6 may include a processor 610, a memory 620, a speaker 630, and an external device connection unit 640, and the processor 610 may include a pattern generation unit 611, a pattern detection unit 613, and a synchronization unit 615.

In the audio signal processing device 600 of FIG. 6, the processor 610 may further include a noise processing unit 612 and an echo signal removing unit 616.

In general, noise having a substantially constant frequency spectrum in a wide frequency range exists in an environment in which the audio signal processing device 600 operates. In an embodiment, the noise processing unit 612 may remove noise from a second audio signal by using an audio signal received from the external voice input device 230.

To this end, before the processor 610 generates a pattern in an audio signal 650, the noise processing unit 612 may receive ambient noise through the external voice input device 230 and store the ambient noise. For example, in a case in which a user intends to make an Internet call with a counterpart terminal by using the external voice input device 230 or to use a voice assistant service, the noise processing unit 612 may receive noise from the external voice input device 230 and store the noise.

In an embodiment, the noise processing unit 612 may continuously receive noise through the external voice input device 230 and update the noise stored therein. The noise processing unit 612 may continuously receive and store noise until it receives the second audio signal from the external voice input device 230.

Thereafter, when a first audio signal in which the pattern is generated by the pattern generation unit 611 is output through the speaker 630 and the second audio signal is input to the external voice input device 230, the noise processing unit 612 may remove as much as the previously stored noise from the second audio signal. This removal is possible because, in general, noise in an environment exists only with an overall noise level without a particular auditory pattern, and thus the previously stored noise is almost similar to noise included in the second audio signal received from the external voice input device 230.

The pattern detection unit 613 may more accurately detect the pattern from the second audio signal by detecting the pattern from a signal from which the noise has been removed by the noise processing unit 612.

The synchronization unit 615 may receives, from the pattern generation unit 611 or the memory 620, information about a point or time point at which the pattern is generated in the audio signal 650, receive, from the pattern detection unit 613, information about a point or time point at which the pattern is detected from the second audio signal, and then synchronize the first audio signal with the second audio signal.

In an embodiment, the synchronization unit 615 may include a buffer. For example, it is assumed that the time point at which the pattern generation unit 611 obtains the first audio signal by generating the pattern in the audio signal 650 is t1, and the time point at which the pattern detection unit 613 detects the pattern from the second audio signal input through the external voice input device 230 is t2. At the time point t2, the buffer of the synchronization unit 615 may store the first audio signal in which the pattern is generated, together with the second audio signal. That is, the buffer may wait from the time point t1 to the time point t2 without storing the first audio signal, and then, in response to the pattern being detected from the second audio signal at the time point t2, store the first audio signal from the point at which the pattern is generated, and the second audio signal from the point at which the pattern is detected. Through this, the synchronization unit 615 may synchronize the first audio signal with the second audio signal.

The echo signal removing unit 616 simultaneously reads the first audio signal and the second audio signal from the buffer of the synchronization unit 615. The echo signal removing unit 616 may remove an overlapping signal from the first audio signal and the second audio signal, which are synchronized with each other. Through this, an echo signal, which is generated as the signal output from the audio signal processing device 600 is input back to the audio signal processing device 600, may be removed.

Figure 7:
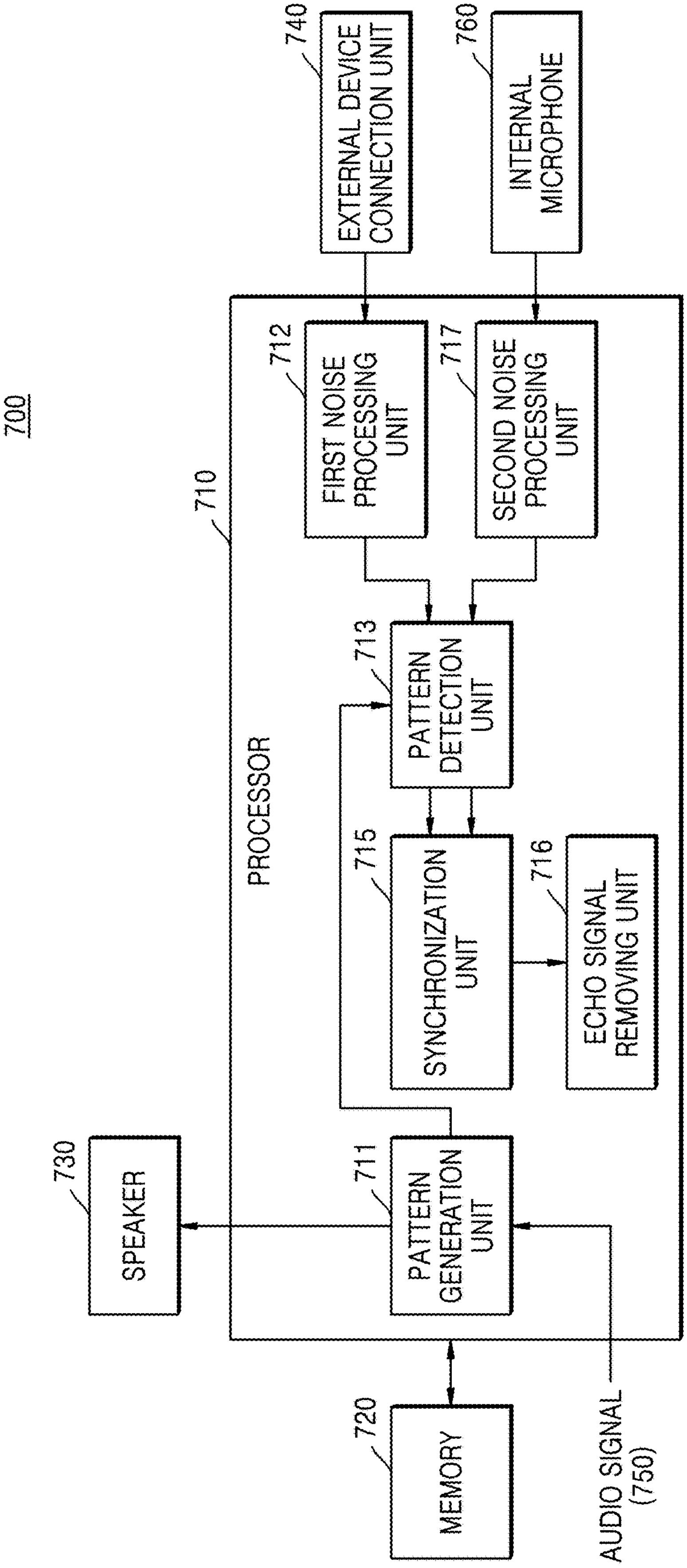
FIG. 7 is an internal block diagram of an audio signal processing device 700 according to an embodiment.

FIG. 7 is an internal block diagram of an audio signal processing device 700 according to an embodiment. The audio signal processing device 700 of FIG. 7 may be included in the audio signal processing device 500 of FIG. 5.

The audio signal processing device 700 of FIG. 7 may include a processor 710, a memory 720, a speaker 730, an external device connection unit 740, and an internal microphone 760, and the processor 710 may include a pattern generation unit 711, a pattern detection unit 713, and a synchronization unit 715. The processor 710 of the audio signal processing device 700 of FIG. 7 may further include a first noise processing unit 712, a second noise processing unit 717, and an echo signal removing unit 716, in addition to the components of the processor 510 of FIG. 5.

In an embodiment, the first noise processing unit 712 may receive noise from the external voice input device 330 and store the noise. In an embodiment, the second noise processing unit 717 may receive noise through the internal microphone 760 and store the noise. The first noise processing unit 712 and the second noise processing unit 717 may receive and store noise before the processor 710 generates a pattern in an audio signal 750.

As described above, the internal microphone 760 and the external voice input device 330 may differ in sound collection performance from each other. Also, signals collected by the internal microphone 760 and the external voice input device 330 may be different from each other, depending on the positions of the internal microphone 760 and the external voice input device 330. Accordingly, noise collected by the internal microphone 319 and noise collected by the external voice input device 330 may differ in magnitude of signal, components, or the like from each other.

Also, time points at which an audio signal is input through the internal microphone 760 and the external voice input device 330, respectively, may be different from each other. This is because, unlike the internal microphone 319 that receives an audio signal as soon as the audio signal is collected, the external voice input device 330 accumulates collected data to a certain amount and then transmits the accumulated data at once. In addition, a signal collected by the external voice input device 330 is input through the communication network 320 and the external device connection unit 217, and thus, a time point at which data is input may vary depending on a communication scheme or the like.

In an embodiment, the processor 311 synchronizes a third audio signal received through the internal microphone 319 with a second audio signal received through the external voice input device 330.

In a case in which a first audio signal in which a pattern is generated by the pattern generation unit 711 is output through the speaker 730, and then a second audio signal including the first audio signal is received by the external voice input device 330, the first noise processing unit 712 may remove the previously stored noise from the second audio signal.

Similarly, in a case in which the first audio signal in which the pattern is generated by the pattern generation unit 711 is output through the speaker 730 and then a third audio signal including the first audio signal is received through the internal microphone 760, the second noise processing unit 717 may remove the previously stored noise from the third audio signal.

The pattern detection unit 713 may detect the pattern from the signals from which the noise has been removed by the first noise processing unit 712 and the second noise processing unit 717, respectively.

The synchronization unit 715 may receive, from the pattern detection unit 713, information about points or time points at which the pattern is detected from the second audio signal and the third audio signal, respectively, synchronize the second audio signal with the third audio signal by using the information, and store the signals in a buffer. For example, it is assumed that a time point at which the pattern is detected from the third audio signal input through the internal microphone 760 is t2, and a time point at which the pattern is detected from the second audio signal input through the external voice input device 330 is t3 (here, t2<t3). At the time point t3, the buffer of the synchronization unit 715 may store the second audio signal from the point at which the pattern is detected. At the same time, the buffer of the synchronization unit 715 may store the third audio signal from the point at which the pattern is detected. That is, the buffer may wait from the time point t2 to the time point t3 without storing the third audio signal, which has been already input through the internal microphone 760, and then store the third audio signal together with the second audio signal at the time point t3 at the pattern is detected from the second audio signal, thereby synchronizing the second audio signal with the third audio signal.

The echo signal removing unit 716 may remove an echo signal generated as a signal output from the audio signal processing device 700 is input back to the audio signal processing device 700. That is, the echo signal removing unit 716 may remove the echo signal by simultaneously reading the second audio signal and the third audio signal from the buffer of the synchronization unit 715, and removing an overlapping signal from the second audio signal and the third audio signal, which are synchronized with each other.

Figure 8:
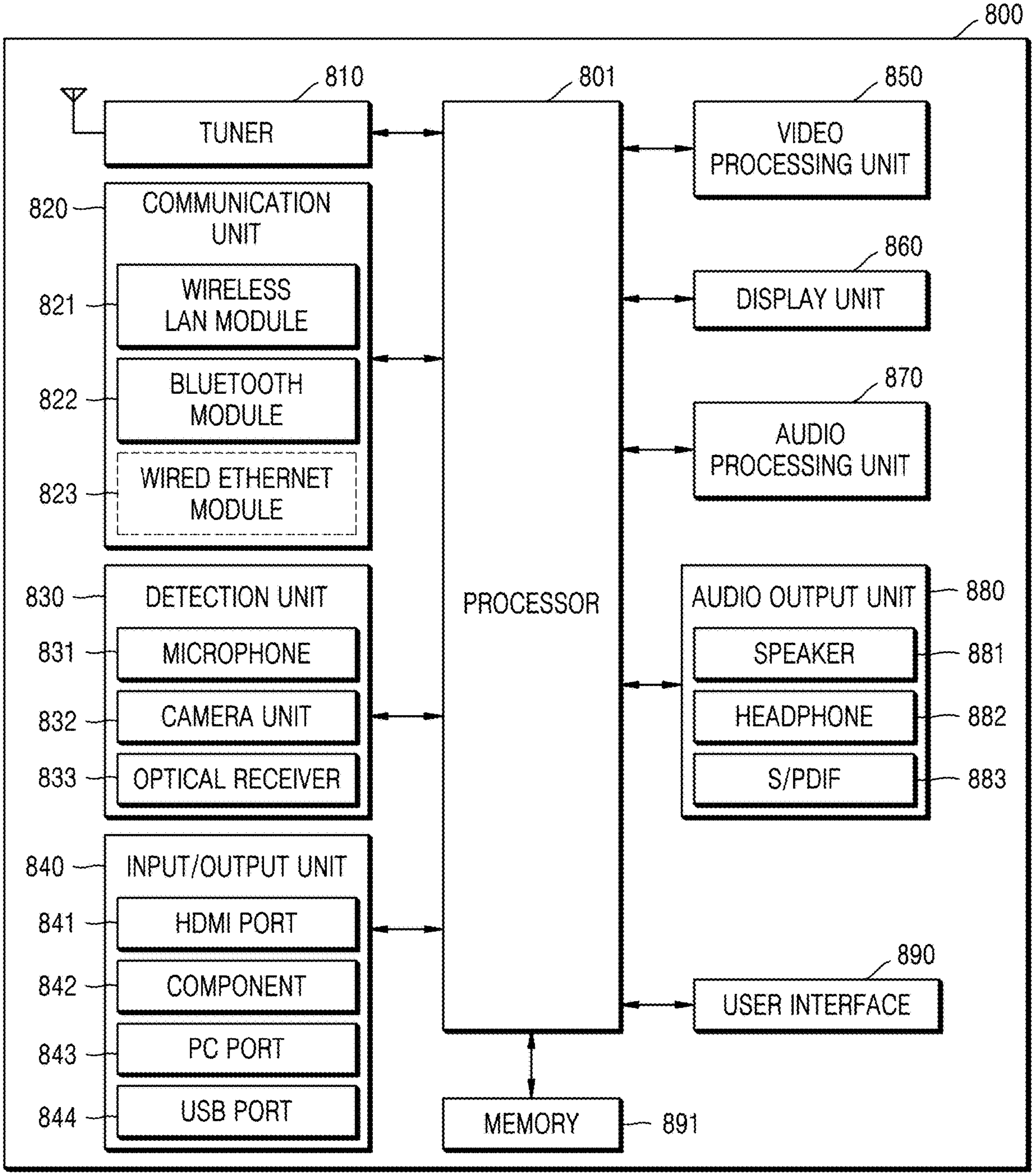
FIG. 8 is an internal block diagram of an image display device 800 including an audio signal processing device, according to an embodiment.

FIG. 8 is an internal block diagram of an image display device including an audio signal processing device, according to an embodiment.

An audio signal processing device according to an embodiment may be included in an image display device 800.

Referring to FIG. 8, the image display device 800 may include a processor 801, a tuner 810, a communication unit 820, a detection unit 830, an input/output unit 840, a video processing unit 850, a display unit 860, an audio processing unit 870, an audio output unit 880, a user interface 890, and a memory 891.

The tuner 810 may be tuned to and select only a frequency of a channel desired to be received by the image display device 800 from among a number of radio wave components by performing amplification, mixing, resonance, or the like on broadcast content or the like received in a wired or wireless manner. The content received through the tuner 810 is decoded (e.g., audio-decoded, video-decoded, or additional information-decoded) to be divided into an audio, a video, and/or additional information. The audio, video, and/or additional information may be stored in the memory 891 under control by the processor 801.

The communication unit 820 may connect the image display device 800 to an external device or a server under control by the processor 801. The image display device 800 may download, from the external device, the server, or the like, a program or an application required by the image display device 800, or perform web browsing, through the communication unit 820. The communication unit 820 may include at least one of a WLAN module 821, a Bluetooth module 822, or a wired Ethernet module 823, in accordance with the performance and structure of the image display device 800. Also, the communication unit 820 may include a combination of the WLAN module 821, the Bluetooth module 822, and the wired Ethernet module 823. The communication unit 820 may receive a control signal through a control device (not shown), such as a remote controller, under control by the processor 801. The control signal may be implemented as a Bluetooth-type signal, a radio frequency (RF) signal-type signal, or a Wi-Fi-type signal. The communication unit 820 may further include other short-range communication modules (e.g., an NFC module and a BLE module) in addition to the Bluetooth module 822.

In an embodiment, the communication unit 820 may be connected to the external voice input device 120 and the like. Also, in an embodiment, the communication unit 820 may be connected to an external server and the like.

The detection unit 830 may detect a voice, an image, or an interaction of a user, and may include a microphone 831, a camera unit 832, and an optical receiver 833. The microphone 831 may receive the user's uttered voice, convert the received voice into an electrical signal, and output the electrical signal to the processor 801.

The camera unit 832 includes a sensor (not shown) and a lens (not shown), and may capture an image formed on a screen.

The optical receiver 833 may receive an optical signal (including a control signal). The optical receiver 833 may receive an optical signal corresponding to a user input (e.g., a touch, a push, a touch gesture, a voice, or a motion) from a control device (not shown), such as a remote controller or a mobile phone. A control signal may be extracted from the received optical signal, under control by the processor 801.

In an embodiment, the microphone 831 may receive an audio signal output through the audio output unit 880.

The input/output unit 840 may receive, from an external database or server, a video (e.g., a moving image signal or a still image signal), an audio (e.g., a voice signal or a music signal), additional information (e.g., a description or title of content, or a storage location of content), etc., under control by the processor 801. Here, the additional information may include metadata about the content.

The input/output unit 840 may include one of an HDMI port 841, a component jack 842, a PC port 842, and a USB port 844. The input/output unit 840 may include a combination of the HDMI port 841, the component jack 842, the PC port 843, and the USB port 844.

In an embodiment, the image display device 800 may receive a second audio signal from the external voice input device 120 through the input/output unit 840. Also, in an embodiment, the image display device 800 may receive content from a source device through the input/output unit 840.

The video processing unit 850 may process image data to be displayed by the display unit 860, and may perform various image processing operations, such as decoding, rendering, scaling, noise filtering, frame rate conversion, and resolution conversion, on the image data.

In an embodiment, the memory 891 may store noise input through the external voice input device 120 and the microphone 831. Also, the memory 891 may store a first audio signal in which a pattern is generated in an audio signal to be output. Also, the memory 891 may store information about the pattern.

In an embodiment, the audio processing unit 870 processes audio data. In an embodiment, the audio processing unit 870 may perform various processing operations, such as decoding or amplification, on the second audio signal input through the external voice input device 120 and a third audio signal input through the microphone 831.

In an embodiment, the audio processing unit 870 may perform noise filtering on audio data. That is, the audio processing unit 870 may remove noise previously stored in the memory 891 from each of the second audio signal and the third audio signal input through the external voice input device 120 and the internal microphone 831.

The audio output unit 880 may output an audio included in content received through the tuner 810, an audio input through the communication unit 820 or the input/output unit 840, and an audio stored in the memory 891, under control by the processor 801. The audio output unit 880 may include at least one of a speaker 881, a headphone output port 882, or a Sony/Philips Digital Interface (S/PDIF) output port 883.

The user interface 890 according to an embodiment may receive a user input for controlling the image display device 800. The user interface 890 may include, but is not limited to, various types of user input devices including a touch panel for detecting a touch of the user, a button for receiving a push manipulation of the user, a wheel for receiving a rotation manipulation of the user, a keyboard, a dome switch, a microphone for voice recognition, a motion sensor for sensing a motion, and the like. Also, when the image display device 800 is operated by a remote controller (not shown), the user interface 890 may receive a control signal from the remote controller.

According to an embodiment, a user may control the image display device 800 through the user interface 890 to perform various functions of the image display device 800. By using the user interface 890, the user may request to perform an Internet call or may cause a voice assistant service to be executed.

In an embodiment, the processor 801 may generate a pattern in an audio signal before outputting the audio signal to the audio output unit 880. The patterned audio signal may be output through the audio output unit 880.

Thereafter, the third audio signal input through the microphone 831 and the second audio signal input through the external voice input device 120 may be adjusted in magnitude by the audio processing unit 870, and noise may be removed therefrom through noise filtering or the like. The processor 801 may detect the pattern from the noise-removed second audio signal and third audio signal, and synchronize the two signals with each other by using the detected pattern.

FIGS. 9A, 9B, 9C and 9D are diagrams for describing a pattern being generated in an audio signal, according to an embodiment.

Figures 9, 9A, 9B, 9C, 9D:
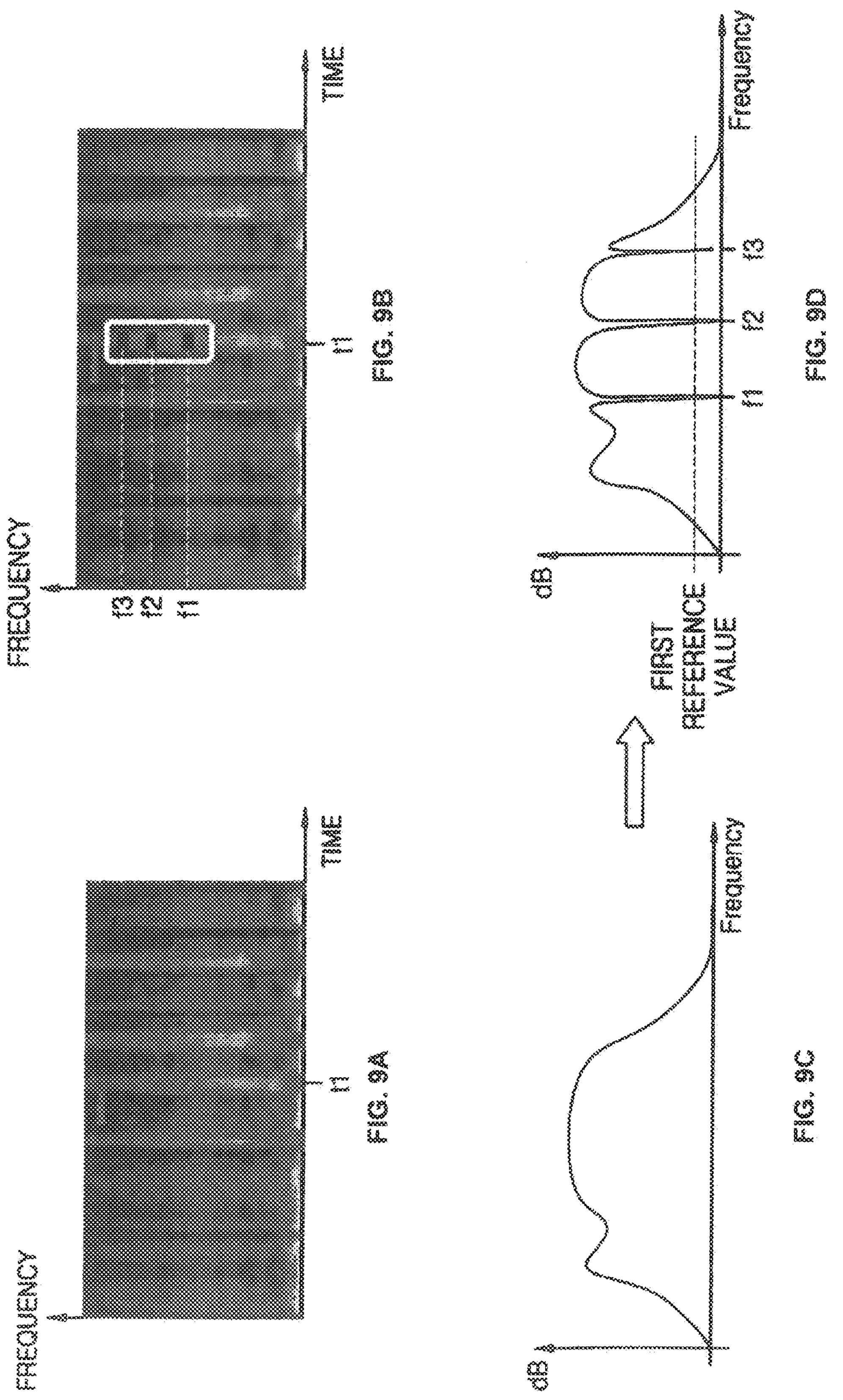
FIGS. 9A, 9B, 9C and 9D are diagrams for describing a pattern being generated in an audio signal, according to an embodiment.

FIG. 9A is an audio signal graph in a time domain, and shows an audio signal before the pattern is generated. In the audio signal graph, the horizontal axis represents time and the vertical axis represents frequency. Also, the color in the graph indicates the intensity of the audio signal. As the intensity of the audio signal increases, the color of the audio signal in the graph becomes more intensive. In FIG. 9A, as the intensity of the audio signal increases, the corresponding region is expressed in a brighter color, and as the intensity of the audio signal decreases, the corresponding region is expressed in a darker color.

FIG. 9C shows the audio signal at a particular time point t1 in the graph of FIG. 9C, and the horizontal axis represents frequency and the vertical axis represents decibel (dB). The decibel is a logarithmic representation of the amplitude representing the loudness/magnitude of a sound, and is used to express a loudness/magnitude.

In an embodiment, the audio signal processing device may generate a pattern in an audio signal to be output, before outputting the audio signal through the speaker.

The audio signal processing device may select one or more certain frequencies at the time point t1, and generate the pattern in the audio signal at the selected frequencies.

FIG. 9B shows a pattern generated in the audio signal at the time point t1 in the graph of FIG. 9A. The audio signal processing device may select a certain frequency at the time point t1, and generate the pattern in the audio signal at the selected frequency.

In an embodiment, the audio signal processing device may randomly select certain frequencies f1, f2, and f3 of the time point t1. Alternatively, the audio signal processing device may select the frequencies f1, f2, and f3 in the descending order of sound intensity at the time point t1. Alternatively, the audio signal processing device may select the frequencies f1, f2, and f3 in the ascending order of sound intensity at the time point t1. Alternatively, the audio signal processing device may select a frequency with the greatest sound intensity at the time point t1, and then select frequencies greater and less than the selected frequency by a certain value, respectively.

In an embodiment, a certain frequency may refer to one frequency value, but is not limited thereto, and may refer to a frequency region including certain frequency values. For example, the audio signal processing device may generate the pattern by adjusting the entire sound volume at a certain frequency region of the audio signal. However, in a case in which the size of the frequency region in which the pattern is generated is greater than a certain value, the patterned audio signal may sound strange to the user, and thus, it is preferable that the size of the frequency region in which the pattern is generated is less than or equal to the certain value.

In an embodiment, the audio signal processing device may generate the pattern by reducing the sound volume of the audio signal at a certain frequency and a particular time point to be less than or equal to a first reference value. FIG. 9B shows a hole pattern generated by the audio signal processing device reducing the sound volume of the audio signal at the frequencies f1, f2, and f3 and the time point t1 to be less than or equal to the first reference value. It may be seen, from FIG. 9B, that the sound volume of the audio signal at the frequencies f1, f2, and f3 is reduced and thus expressed in black.

FIG. 9D shows a relationship between the frequency and sound volume of the audio signal at the time point t1 of the graph of FIG. 9B. It may be seen, from the graph of FIG. 9D, that, unlike in FIG. 9C, the sound volume of the audio signal at the frequencies f1, f2, and f3 is reduced to be less than or equal to the first reference value.

The audio signal processing device may obtain the first audio signal by generating the pattern in the audio signal as described above, and output the first audio signal through the speaker. Thereafter, the external voice input device 120 may collect the second audio signal including the patterned audio signal and transmit the second audio signal to the audio signal processing device.

The audio signal processing device may detect the pattern from the signal input through the external voice input device. That is, the audio signal processing device may detect, as the pattern, a certain number of points in the second audio signal at which the sound volume of the audio signal is less than the first reference value, that is, three points as in the example of FIGS. 9A, 9B and 9C.

The audio signal processing device may synchronize the second audio signal with the first audio signal by using a point at which the pattern is detected from the second audio signal. Alternatively, in an embodiment, in a case in which the audio signal processing device includes an internal microphone, the audio signal processing device may detect the pattern from the third audio signal in a similar manner, and synchronize the second audio signal with the third audio signal by using the detected pattern.

FIGS. 10A, 10B and 9C is a diagram for describing a pattern being generated in an audio signal, according to an embodiment.

FIG. 10A is a graph of the audio signal before the pattern is generated, and FIG. 10C shows the frequency and decibel of the audio signal at a particular time point t1 in the graph of FIG. 10A.

In an embodiment, the audio signal processing device may select one or more certain frequencies at the time point t1, and generate the pattern in the audio signal at the selected frequencies.

FIG. 10B shows a pattern generated in the audio signal at the time point t1 in the graph of FIG. 10A. Referring to FIG. 10B, the audio signal processing device may generate the pattern by adjusting the magnitude of the audio signal at certain frequencies f1, f2, and f3 and the time point t1.

The color in the graph indicates the intensity of the audio signal, and as the intensity of the audio signal increases, the audio signal is expressed in a brighter color, and as the intensity of the audio signal decreases, the audio signal is expressed in a darker color.

In an embodiment, the audio signal processing device may generate the pattern by adjusting the sound volume of the audio signal at a certain frequency and a particular time point to be greater than or equal to a second reference value. FIG. 10B shows a hole pattern generated by the audio signal processing device increasing the sound volume of the audio signal at the frequencies f1, f2, and f3 and the time point t1. It may be seen that the sound volume of the audio signal at the frequencies f1, f2, and f3 is increased and thus expressed in white.

FIG. 10D shows a relationship between the frequency and sound volume (which is expressed in decibels) of the audio signal at the time point t1 of the graph of FIG. 10D. It may be seen, from the graph FIG. 10D, that the sound volume of the audio signal at the frequencies f1, f2, and f3 is greater than or equal to the second reference value, and thus is greater than that at the adjacent frequencies. In an embodiment, the audio signal processing device may generate the pattern in the audio signal as described above and output the audio signal through the speaker. Thereafter, the audio signal processing device may receive, from the external voice input device, the second audio signal including the patterned audio signal.

The audio signal processing device may detect the pattern from the received second audio signal. In an embodiment, the audio signal processing device may detect, as the pattern, a certain number of points in the second audio signal at which the sound volume of the audio signal is greater than or equal to the second reference value, that is, three points as in the example of FIGS. 10A, 10B, 10C and 10D.

The audio signal processing device may synchronize the second audio signal with the first audio signal by using a point at which the pattern is detected from the second audio signal. Alternatively, in an embodiment, in a case in which the audio signal processing device includes an internal microphone, the audio signal processing device may detect the pattern from the third audio signal in a similar manner, and synchronize the second audio signal with the third audio signal by using the detected pattern.

FIGS. 11A, 11B and 11C is a diagram for describing an audio signal processing device detecting a pattern after removing noise from an audio signal, according to an embodiment.

In general, noise having an overall constant frequency spectrum exists in an environment in which the audio signal processing device operates. In an embodiment, the audio signal processing device may receive, from an external voice input device, and store in advance noise in such an environment.

FIG. 11A is a graph showing noise received by the audio signal processing device through the external voice input device. The audio signal processing device may receive and store ambient noise in advance before detecting a pattern from a second audio signal. For example, before generating the pattern in the audio signal to be output, at a time point of generating the pattern in the audio signal, or within a certain time period from the time point of generating the pattern in the audio signal, the audio signal processing device may receive and store the noise from the external voice input device in advance.

In a case in which the audio signal processing device includes an internal microphone, the audio signal processing device may receive and store noise in advance through the internal microphone as well as the external voice input device.

For example, it is assumed that the audio signal processing device generates the pattern in the audio signal as illustrated in FIG. 9D, and outputs the audio signal. Thereafter, the audio signal processing device may receive the second audio signal from the external voice input device. FIG. 11B is a graph of the second audio signal. Unlike an audio signal that is output after a pattern is generated therein, i.e., the audio signal of the graph of FIG. 9D, it may be seen, from the graph of FIG. 11B, that the sound volume of the audio signal at the frequencies f1, f2, and f3 is greater than the first reference value. In this case, it is difficult for the audio signal processing device to accurately detect the pattern from the second audio signal.

In an embodiment, the audio signal processing device may first remove noise from the second audio signal before detecting the pattern from the second audio signal. The audio signal processing device may remove, from the second audio signal, the previously received and stored noise.

FIG. 11C is a graph of an audio signal obtained by removing the noise from the second audio signal. Like the graph of FIG. 9D, it may be seen, from the graph of FIG. 11C, that the sound volume of the audio signal at the frequencies f1, f2, and f3 is less than the first reference value. The audio signal processing device may detect, as the pattern, a region having three points at which the sound volume of the audio signal at the frequencies f1, f2, and f3 is less than the first reference value.

Similarly, in a case in which the audio signal processing device includes an internal microphone, the audio signal processing device may receive, through the internal microphone, and store noise in advance. The audio signal processing device may detect the pattern after removing the previously stored noise from a third audio signal input through the internal microphone.

As described above, according to an embodiment, the audio signal processing device may store ambient noise in advance, and when a signal including the pattern is input, remove the ambient noise from the input signal. Accordingly, the audio signal processing device may more accurately detect the pattern from the audio signal.

Figure 12:
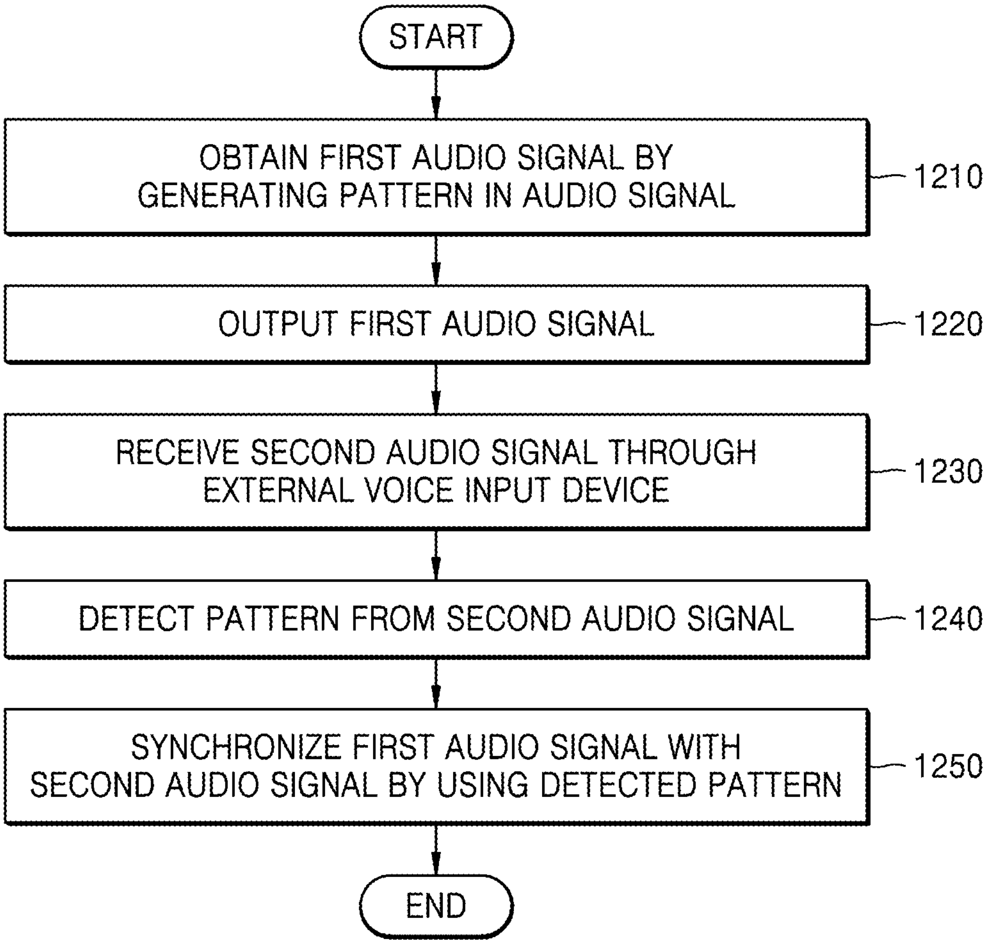
FIG. 12 is a flowchart of a process of synchronizing an external voice input device with an audio signal processing device, according to an embodiment.

FIG. 12 is a flowchart of a process of synchronizing an external voice input device with an audio signal processing device, according to an embodiment.

Referring to FIG. 12, the audio signal processing device may obtain a first audio signal by generating a pattern in an audio signal to be output (operation 1210). The audio signal processing device may decrease or increase the magnitude of the audio signal to be output, at a certain frequency thereof, to be less than or equal to a first reference value, or to be greater than or equal to a second reference value.

The audio signal processing device may output the signal in which the pattern is generated, i.e., the first audio signal, through a speaker (operation 1220).

Thereafter, the audio signal processing device may receive a second audio signal from an external voice input device (operation 1230). The second audio signal may be a signal obtained by the external voice input device collecting the first audio signal output through the speaker. The second audio signal may further include ambient noise in addition to the first audio signal.

The audio signal processing device may detect the pattern from the second audio signal (operation 1240). The audio signal processing device may determine whether the pattern generated when obtaining the first audio signal is included in the second audio signal.

The audio signal processing device may synchronize the second audio signal with the first audio signal by using the pattern detected from the second audio signal. Assuming that the time point at which the audio signal processing device obtains the first audio signal by generating the pattern in the audio signal is t1, and the time point at which the pattern is detected from the second audio signal input through the external voice input device is t2, the audio signal processing device may store, in an internal buffer, the second audio signal and the first audio signal in which the pattern is generated, from the time point t2. The audio signal processing device may store the first audio signal together with the second audio signal, at the time point at which the pattern is detected from the second audio signal, that is, at the time point t2.

The audio signal processing device may simultaneously read the first audio signal and the second audio signal from the buffer to synchronize the signals with each other, and then remove an overlapping signal from the signals synchronized with each other.

Figure 13:
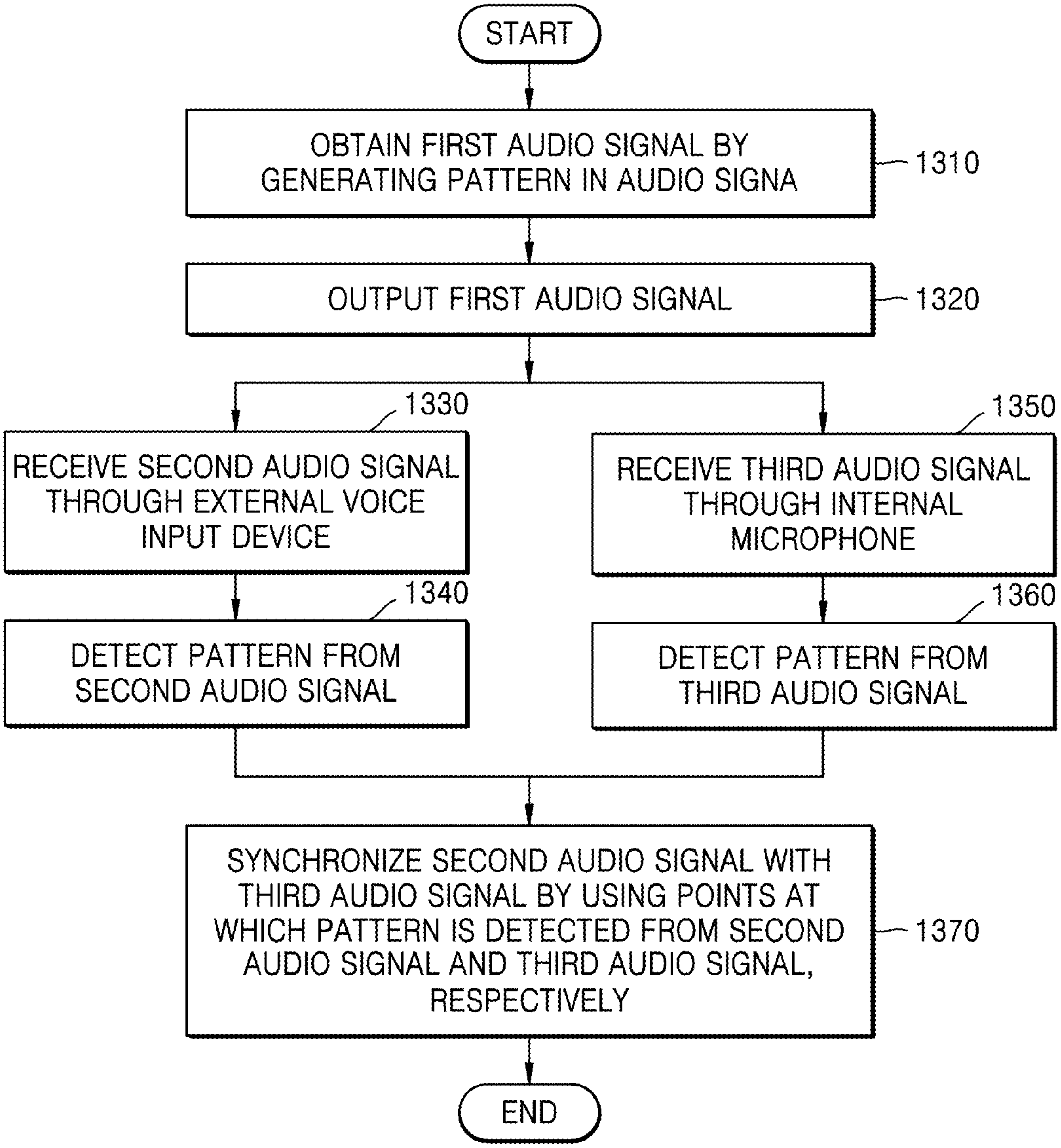
FIG. 13 is a flowchart of a process of synchronizing an external voice input device with an audio signal processing device, according to an embodiment.

FIG. 13 is a flowchart of a process of synchronizing an external voice input device with an audio signal processing device, according to an embodiment.

Referring to FIG. 13, the audio signal processing device may obtain a first audio signal by generating a pattern in an audio signal to be output (operation 1310). The audio signal processing device may output the first audio signal through a speaker (operation 1320).

The audio signal processing device may receive a second audio signal from an external voice input device (operation 1330). The second audio signal is a signal obtained by the external voice input device collecting the first audio signal output through a speaker, and may include the first audio signal and other noise. The audio signal processing device may detect the pattern from the second audio signal (operation 1340).

In an embodiment, the audio signal processing device may include an internal microphone.

The audio signal processing device may receive a third audio signal from the internal microphone (operation 1350). The third audio signal is a signal obtained by the internal microphone collecting the first audio signal output through a speaker, and may include the first audio signal and other noise. The audio signal processing device may detect the pattern from the third audio signal (operation 1360).

The audio signal processing device may synchronize the second audio signal with the third audio signal by using the pattern detected from the second audio signal and the pattern detected from the third audio signal (operation 1370). The audio signal processing device may synchronize the two signals with each other based on the later one of a time point at which the pattern is detected from the third audio signal and a time point at which the pattern is detected from the second audio signal, which is determined based on the difference between the time points. The audio signal processing device may remove an echo signal by removing an overlapping signal from the second audio signal and the third audio signal, which are synchronized with each other.

Figure 14:
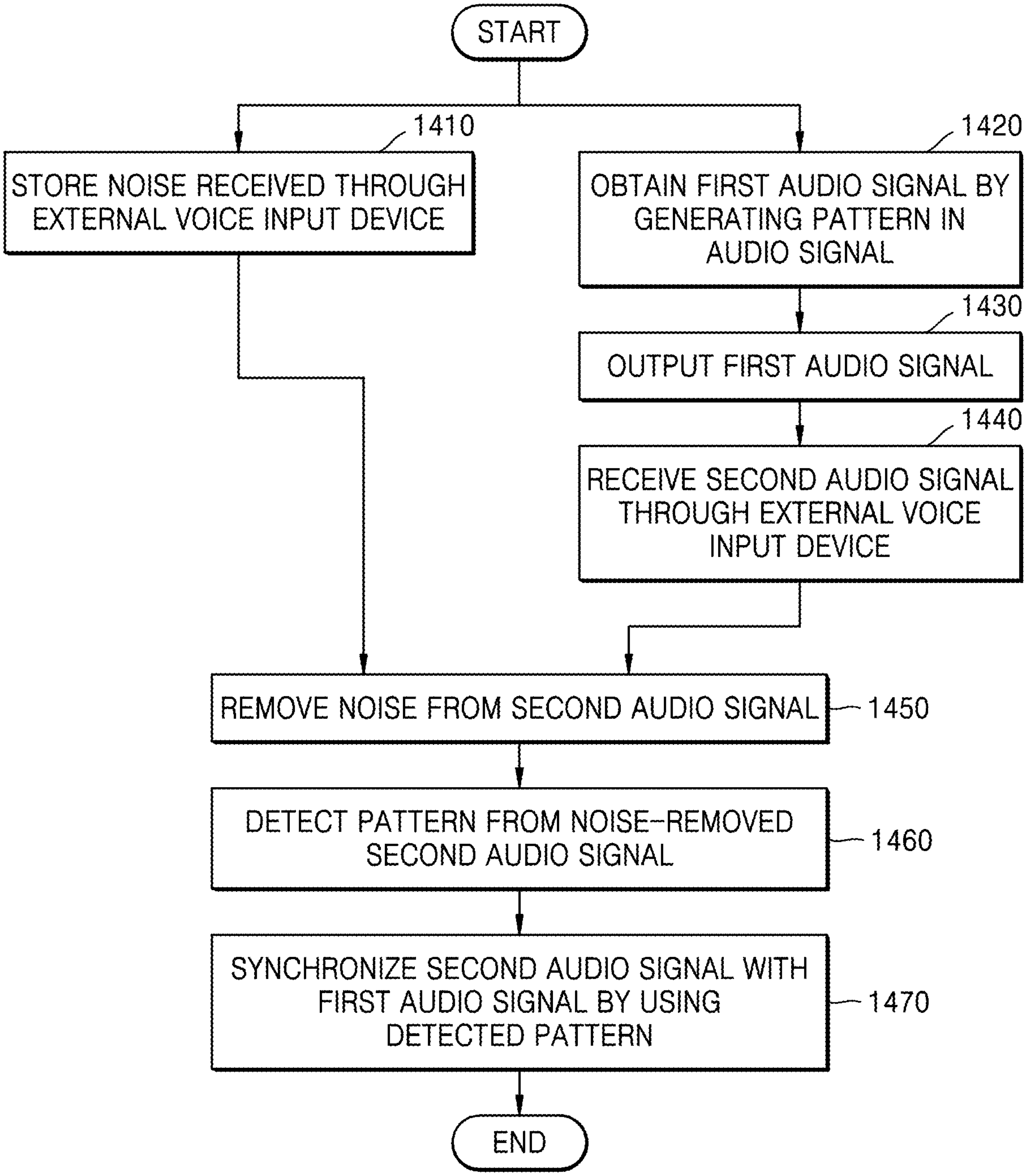
FIG. 14 is a flowchart of a process of synchronizing an external voice input device with an audio signal processing device, according to an embodiment.

FIG. 14 is a flowchart of a process of synchronizing an external voice input device with an audio signal processing device, according to an embodiment.

Referring to FIG. 14, the audio signal processing device may receive, through an external voice input device, and store noise in advance (operation 1410). The audio signal processing device may continuously receive noise from the external voice input device, update the previously stored noise, and store the updated noise, until a second audio signal is received from the external voice input device.

The audio signal processing device may obtain a first audio signal by generating a pattern in an audio signal to be output (operation 1420), and output the first audio signal through a speaker (operation 1430).

The audio signal processing device may receive the second audio signal through an external voice input device connected thereto (operation 1440).

The audio signal processing device may remove the previously stored noise from the second audio signal (operation 1450). The audio signal processing device may detect the pattern from the noise-removed second audio signal (operation 1460), and synchronize the first audio signal with the second audio signal by using the detected pattern (operation 1470).

Figure 15:
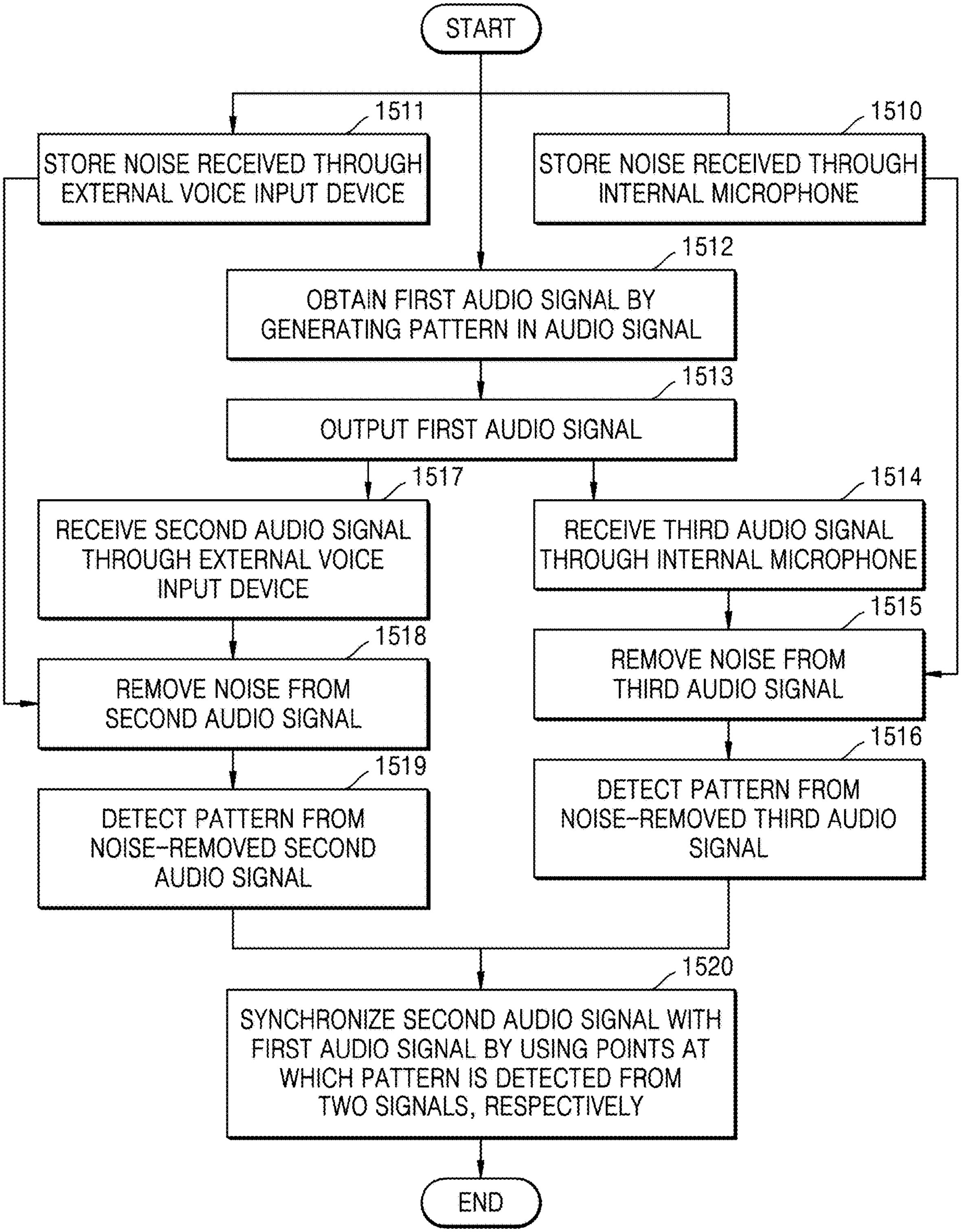
FIG. 15 is a flowchart of a process of synchronizing an external voice input device with an audio signal processing device, according to an embodiment.

FIG. 15 is a flowchart of a process of synchronizing an external voice input device with an audio signal processing device, according to an embodiment.

Referring to FIG. 15, the audio signal processing device may receive, through an internal microphone, and store noise (operation 1510). Also, the audio signal processing device may receive, through an external voice input device, and store noise (operation 1511). The internal microphone and the external voice input device differ in sound collection performance from each other depending on their specifications or the like, and accordingly, the noise input through the internal microphone and the noise input through the external voice input device may differ in component and size from each other.

The audio signal processing device may obtain a first audio signal by generating a pattern in an audio signal to be output (operation 1512), and output the first audio signal through a speaker (operation 1513).

In an embodiment, the audio signal processing device may include the internal microphone.

The audio signal processing device may receive a third audio signal through the internal microphone (operation 1514). The audio signal processing device may remove, from the third audio signal, the noise that is previously received through the internal microphone and then stored (operation 1515). The audio signal processing device may detect the pattern from the noise-removed third audio signal (operation 1516).

Similarly, the audio signal processing device may receive a second audio signal from the external voice input device (operation 1517), and remove, from the second audio signal, the noise that is previously received through the external voice input device and then stored (operation 1518). The audio signal processing device may detect the pattern from the noise-removed second audio signal (operation 1519).

The audio signal processing device may compare the pattern of each of the noise-removed second audio signal and third audio signal to synchronize the two signals with each other (operation 1520).

An audio signal processing device and an operating method thereof according to some embodiments may be implemented as a recording medium including computer-executable instructions, such as a computer-executable program module. A computer-readable medium may be any available medium which is accessible by a computer, and may include a volatile or non-volatile medium and a removable or non-removable medium. Also, the computer-readable media may include computer storage media and communication media. The computer storage media include both volatile and non-volatile, removable and non-removable media implemented in any method or technique for storing information such as computer readable instructions, data structures, program modules or other data. The communication medium typically includes computer-readable instructions, data structures, program modules, other data of a modulated data signal, or other transmission mechanisms, and examples thereof include an arbitrary information transmission medium.

In addition, in the present specification, the term "unit" may be a hardware component such as a processor or a circuit, and/or a software component executed by a hardware component such as a processor.

In addition, the audio signal processing method according to the embodiment of the present disclosure described above may be implemented as a computer program product including a computer-readable recording medium having recorded thereon a program for executing an audio signal processing method including obtaining a first audio signal by generating a pattern in an audio signal to be output, outputting the first audio signal, receiving, through the external voice input device, a second audio signal including the output first audio signal, detecting the pattern from the second audio signal, and synchronizing the second audio signal with the first audio signal based on the pattern detected from the second audio signal and the pattern included in the first audio signal.

The above description is provided only for illustrative purposes, and those of skill in the art will understand that the present disclosure may be easily modified into other detailed configurations without modifying technical aspects and essential features of the present disclosure. Therefore, it should be understood that the above-described embodiments of the present disclosure are exemplary in all respects and are not limited. For example, the components described as single entities may be distributed in implementation, and similarly, the components described as distributed may be combined in implementation.

The invention claimed is:

1. An audio signal processing method performed by an audio signal processing device, the audio signal processing method comprising:

in response to an external voice input device being used to receive an external audio signal, obtaining a first audio signal by generating a pattern in an audio signal to be output, wherein generating the pattern comprises, at a selected time point of the audio signal, adjusting a magnitude of one or more frequency components of the audio signal such that the adjusted magnitude is greater than or equal to a predetermined reference value or less than or equal to a predetermined reference value;

outputting the first audio signal;

receiving, through a microphone of the external voice input device while the external voice input device is communicatively connected to the audio signal processing device, a second audio signal including the output first audio signal;

detecting the pattern from the second audio signal, wherein detecting the pattern comprises identifying, in the second audio signal, the one or more frequency components whose magnitudes are greater than or equal to the predetermined reference value or less than or equal to the predetermined reference value at the selected time point; and synchronizing the second audio signal with the first audio signal by comparing the pattern detected from the second audio signal with the pattern included in the first audio signal.

2. The audio signal processing method of claim 1, further comprising removing an overlapping signal from the first audio signal and the second audio signal, which are synchronized with each other.

3. The audio signal processing method of claim 1, wherein the one or more frequency components comprise a plurality of frequency components.

4. The audio signal processing method of claim 3, wherein the one or more frequency components comprise a frequency region including a plurality of adjacent frequency components.

5. The audio signal processing method of claim 1, wherein the one or more frequency components are identified based on magnitudes of the audio signal at the selected time point.

6. The audio signal processing method of claim 1, wherein the detecting of the pattern comprises detecting, as the pattern, a section including a certain number of points at which a magnitude of the second audio signal is less than or equal to the predetermined reference value at the selected time point.

7. The audio signal processing method of claim 1, wherein the detecting of the pattern comprises detecting, as the pattern, a section including a certain number of points at which a magnitude of the second audio signal is greater than or equal to the predetermined reference value at the selected time point.

8. The audio signal processing method of claim 1, further comprising identifying whether a human voice is included in the second audio signal, wherein the detecting of the pattern from the second audio signal at the selected time point is performed based on determining that the human voice is not included in the second audio signal.

9. The audio signal processing method of claim 8, wherein the identifying of whether the human voice is included in the second audio signal is performed based on whether a signal of a certain frequency band with a certain magnitude or more is included in the second audio signal.

10. The audio signal processing method of claim 1, wherein the synchronizing of the first audio signal with the second audio signal comprises synchronizing the first audio signal with the second audio signal by shifting a point at which the pattern is generated at the selected time point in the first audio signal, to a point at which the pattern is detected from the second audio signal.

11. The audio signal processing method of claim 1, further comprising: receiving noise through the external voice input device and storing the noise; and removing the noise from the second audio signal, wherein the synchronizing of the second audio signal with the first audio signal is performed after the noise is removed from the second audio signal.

12. An audio signal processing method performed by an audio signal processing device, which includes an internal microphone, the audio signal processing method comprising:

in response to an external voice input device being used to receive an external audio signal, obtaining a first audio signal by generating a pattern in an audio signal to be output, wherein generating the pattern comprises, at a selected time point of the audio signal, adjusting a magnitude of one or more frequency components of the audio signal such that the adjusted magnitude is greater than or equal to a predetermined reference value or less than or equal to a predetermined reference value;

outputting the first audio signal;

receiving, through a microphone of the external voice input device while the external voice input device is connected to the audio signal processing device, a second audio signal including the output first audio signal;

detecting the pattern from the second audio signal;

receiving, through the internal microphone, a third audio signal including the output first audio signal;

detecting the pattern from the third audio signal, wherein detecting the pattern from the second audio signal and from the third audio signal comprises identifying, in the second audio signal and in the third audio signal, the one or more frequency components whose magnitudes are greater than or equal to the predetermined reference value or less than or equal to the predetermined reference value at the selected time point; and synchronizing the second audio signal with the third audio signal based on a difference between a time point at which the pattern is detected from the third audio signal and a time point at which the pattern is detected from the second audio signal.

13. An audio signal processing device, comprising:

a speaker to output an audio signal;

a memory to store one or more instructions; and a processor configured to execute the one or more instructions stored in the memory to:

in response to an external voice input device being used to receive an external audio signal, obtain a first audio signal by generating a pattern in an audio signal to be output, wherein generating the pattern comprises, at a selected time point of the audio signal, adjusting a magnitude of one or more frequency components of the audio signal such that the adjusted magnitude is greater than or equal to a predetermined reference value or less than or equal to a predetermined reference value;

control the speaker to output the first audio signal;

receive, through a microphone of the external voice input device while the external voice input device is connected to the audio signal processing device, a second audio signal including the output first audio signal;

detect the pattern from the second audio signal, wherein detecting the pattern comprises identifying, in the second audio signal, the one or more frequency components whose magnitudes are greater than or equal to the predetermined reference value or less than or equal to the predetermined reference value at the selected time point; and synchronize the second audio signal with the first audio signal by comparing the pattern detected from the second audio signal and the pattern included in the first audio signal.

* * * * *